(12) United States Patent
Baldemair et al.

(10) Patent No.: US 11,997,044 B2
(45) Date of Patent: *May 28, 2024

(54) FLEXIBLE INDICATION FOR START POSITION OF DATA CHANNEL

(71) Applicant: Telefonaktiebolaget LM Ericsson (publ), Stockholm (SE)

(72) Inventors: Robert Baldemair, Solna (SE); Håkan Björkegren, Täby (SE); Erik Dahlman, Stockholm (SE); Stefan Parkvall, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/143,488

(22) Filed: May 4, 2023

(65) Prior Publication Data

US 2023/0275731 A1  Aug. 31, 2023

Related U.S. Application Data

(63) Continuation of application No. 17/337,499, filed on Jun. 3, 2021, now Pat. No. 11,683,143, which is a (Continued)

(51) Int. Cl.
*H04L 5/00* (2006.01)
*H04W 72/23* (2023.01)

(52) U.S. Cl.
CPC .......... *H04L 5/0053* (2013.01); *H04L 5/0007* (2013.01); *H04L 5/0073* (2013.01); *H04W 72/23* (2023.01)

(58) Field of Classification Search
CPC ... H04L 5/0053; H04L 5/0007; H04L 5/0073; H04W 72/23; H04W 72/042; H04W 72/1289

See application file for complete search history.

(56) References Cited

U.S. PATENT DOCUMENTS 11,357,021 B2  6/2022  Kim et al.
2012/0099519 A1  4/2012  Kim et al.
(Continued)

FOREIGN PATENT DOCUMENTS

CN  102714562 A  10/2012
CN  104641582 A  5/2015
(Continued)

OTHER PUBLICATIONS

Unknown, Author, "PDSCH Starting Symbol Indication for Cross-Carrier Scheduling", TSG-RAN WG1 Meeting #61, R1-102707, Montreal, Canada, May 10-14, 2010, 1-3.
(Continued)

*Primary Examiner* — Habte Mered
(74) *Attorney, Agent, or Firm* — Murphy, Bilak & Homiller, PLLC

(57) ABSTRACT

A node (100) of a wireless communication network manages sending of control information to a radio device (10). For a first frequency band, the control information indicates a first start position for transmission of a data channel. For a second frequency band, the control information indicates a second start position for transmission of the data channel. Based on the first start position and the second start position, the node (100) controls transmission of data on the data channel.

17 Claims, 17 Drawing Sheets

Related U.S. Application Data continuation of application No. 16/305,125, filed as application No. PCT/EP2016/067444 on Jul. 21, 2016, now Pat. No. 11,038,651.

(56) References Cited

U.S. PATENT DOCUMENTS

| | | |
|---|---|---|
| 2013/0107855 A1 | 5/2013 | Takeda et al. |
| 2013/0250882 A1 | 9/2013 | Dinan |
| 2014/0086197 A1 | 3/2014 | Yang et al. |
| 2015/0092739 A1 | 4/2015 | Kwak et al. |
| 2016/0204926 A1 | 7/2016 | Shi |
| 2017/0111913 A1 | 4/2017 | Li et al. |
| 2017/0164384 A1 | 6/2017 | Wang et al. |
| 2017/0223727 A1 | 8/2017 | Davydov et al. |
| 2018/0049164 A1 | 2/2018 | Wu et al. |
| 2018/0054291 A1 | 2/2018 | Yi et al. |
| 2018/0242317 A1 | 8/2018 | Marinier et al. |
| 2018/0279285 A1 | 9/2018 | Yang et al. |
| 2019/0089509 A1 | 3/2019 | Wong et al. |
| 2019/0124705 A1 | 4/2019 | Li et al. |

FOREIGN PATENT DOCUMENTS

| | | |
|---|---|---|
| EP | 1803314 B1 | 3/2016 |
| JP | 2012050120 A | 3/2012 |
| JP | 2016500208 A | 1/2016 |
| JP | 2016518091 A | 6/2016 |
| WO | 2013027947 A2 | 2/2013 |
| WO | 2016003614 A1 | 1/2016 |
| WO | 2016018526 A1 | 2/2016 |
| WO | 2017162438 A1 | 9/2017 |

OTHER PUBLICATIONS

Unknown, Author, "Remaining details for the PDSCH starting symbol in TM10", 3GPP TSG RAN WG1 Meeting #71, R1-124696, New Orleans, USA, Nov. 12-16, 2012, 1-3.

FLEXIBLE INDICATION FOR START POSITION OF DATA CHANNEL

RELATED APPLICATIONS

This application is a continuation of U.S. patent application Ser. No. 17/337,499, filed Jun. 3, 2021, which in turn is a continuation of U.S. patent application Ser. No. 16/305,125, filed Nov. 28, 2018, now issued as U.S. Pat. No. 11,038,651, which in turn was the National Stage of International Application No. PCT/EP2016/067444, filed Jul. 21, 2016, each of which is incorporated by reference in its entirety.

TECHNICAL FIELD

The present invention relates to methods of controlling radio transmissions in a wireless communication network and to corresponding devices and systems.

BACKGROUND

In wireless communication networks it is known to define data channels to be used for conveying user plane data and control channels to be used for conveying control information, in particular control information for controlling transmissions on the data channels, such as resource allocation information. For example, in the LTE (Long Term Evolution) technology as defined by 3GPP ($3^{rd}$ Generation Partnership Project) a DL (downlink) control channel referred to as PDCCH (Physical DL Control Channel) is used to convey DL control information to a UE (user equipment). The DL control information may for example include a DL assignment which indicates radio resources of a DL data channel, referred to as PDSCH (Physical DL Shared Channel), assigned to the UE for a DL transmission of data. The DL control information may for example include a UL (uplink) grant which indicates radio resources of a UL data channel, referred to as PUSCH (Physical UL Shared Channel), assigned to the UE for a UL transmission of data. The PDCCH provides dedicated radio resources for each UE and is transmitted in the first (one, two, three, or four) OFDM (Orthogonal Frequency Division Multiplexing) symbols of a subframe, which is also referred to as "control region". The PDSCH starts after the control region.

In 3GPP contribution "Remaining details for the PDSCH starting symbol in TM10" by Huawei and HiSilicon, document R1-124696, 3GPP TSG RAN WG1 Meeting #71, New Orleans, USA, Nov. 12-16, 2012, it is suggested that the PDSCH can already start at symbol 0, i.e., the first OFDM symbol of a subframe, and that utilization of this early start position can be indicated to the UE by RRC (Radio Resource Control) signaling.

If only a single PDCCH (for one UE) is transmitted in the first OFDM symbol(s) and this PDCCH schedules PDSCH transmissions of this UE, the PDSCH transmissions for this UE could thus start at the first OFDM symbol of the subframe. Such a resource allocation is no problem because the UE decodes the PDCCH and thus knows its time-frequency location, and from the scheduling information contained in PDCCH the UE knows the region of the time-frequency-grid which contains the PDSCH transmissions. If this region (partly) overlaps with the PDCCH, the UE is aware of that and can deduce that radio resources actually used for the PDSCH transmissions to be corresponding to the region indicated by the scheduling information minus the overlapping PDCCH resources. Further, no problems should be expected if a further PDCCH (for another UE) is transmitted on radio resources that do not overlap with the region of the time-frequency grid which contains the PDSCH transmissions. However, in some situations it can be difficult or inefficient to avoid such overlap, specifically when also taking into account that in the LTE technology the allocation of PDSCH radio resources is performed with a granularity of one PRB (Physical Resource Block).

Accordingly, there is a need for techniques which allow for efficiently controlling radio transmissions with respect to potential overlap of radio resources used for transmission of a DL control channel and radio resources used for transmission of a DL data channel.

SUMMARY

According to an embodiment of the invention, a method of controlling radio transmission in a wireless communication network is provided. According to the method, a node of the wireless communication network manages sending of control information to a radio device. For a first frequency band, the control information indicates a first start position for transmission of a data channel. For a second frequency band, the control information indicates a second start position for transmission of the data channel. Based on the first start position and the second start position, the node controls transmission of data on the data channel.

According to a further embodiment of the invention, a method of controlling radio transmission in a wireless communication network is provided. According to the method, a node of the wireless communication network determines potential interference of a data channel for a radio device and a DL control channel for a further radio device. Depending on the potential interference, the node determines a start position of the data channel. Further, the node manages sending of control information to the radio device. The control information indicates the start position of the data channel. Based on the start position, the node controls transmission of data on the data channel.

According to a further embodiment of the invention, a method of controlling radio transmission in a wireless communication network is provided. According to the method, a radio device receives control information from a wireless communication network. For a first frequency band, the control information indicates a first start position for transmission of a data channel. For a second frequency band, the control information indicates a second start position for transmission of the data channel. Based on the first start position and the second start position, the radio device receives data on the data channel.

According to a further embodiment of the invention, a node for a wireless communication network is provided. The node is configured to manage sending of control information to a radio device. For a first frequency band, the control information indicates a first start position for transmission of a data channel. For a second frequency band, the control information indicates a second start position for transmission of the data channel. Further, the node is configured to control transmission of data based on the first start position and the second start position.

According to a further embodiment of the invention, a node for a wireless communication network is provided. The node is configured to determine potential interference of a data channel for a radio device and a DL control channel for a further radio device. Further, the node is configured to determine a start position of the data channel depending on the potential interference. Further, the node is configured to manage sending of control information to the radio device. The control information indicates the start position of the data channel. Further, the node is configured to control transmission of data on the data channel based on the start position.

According to a further embodiment of the invention, a radio device is provided. The radio device is configured to receive control information from a wireless communication network. For a first frequency band, the control information indicates a first start position for transmission of a data channel. For a second frequency band, the control information indicates a second start position for transmission of the data channel. Further, the radio device is configured to control receiving of data on the data channel based on the first start position and the second start position.

According to a further embodiment of the invention, a system for a wireless communication network is provided. The system comprises a node of the wireless communication network; and a radio device. The node is configured to manage sending of control information to a radio device. For a first frequency band, the control information indicates a first start position for transmission of a data channel. For a second frequency band, the control information indicates a second start position for transmission of the data channel. The radio device is being configured to receive the control information and, based on the first start position and the second start position, control receiving of data on the data channel.

According to a further embodiment of the invention, a system for a wireless communication network is provided. The system comprises a node of the wireless communication network; and a radio device. The node is configured to determine potential interference of a data channel for the radio device and a DL control channel for a further radio device. Further, the node is configured to determine a start position of the data channel depending on the potential interference. Further, the node is configured to manage sending of control information to the radio device. The control information indicates the start position of the data channel. The radio device is configured to control receiving of data on the data channel based on the start position.

According to a further embodiment of the invention, a computer program or computer program product is provided, e.g., in the form of a non-transitory storage medium, which comprises program code to be executed by at least one processor of a node of a wireless communication network. Execution of the program code causes the node to manage sending of control information to a radio device. For a first frequency band, the control information indicates a first start position for transmission of a data channel. For a second frequency band, the control information indicates a second start position for transmission of the data channel. Further, execution of the program code causes the node to control transmission of data based on the first start position and the second start position.

According to a further embodiment of the invention, a computer program or computer program product is provided, e.g., in the form of a non-transitory storage medium, which comprises program code to be executed by at least one processor of a node of a wireless communication network. Execution of the program code causes the node to determine potential interference of a data channel for a radio device and a DL control channel for a further radio device. Further, execution of the program code causes the node to determine a start position of the data channel depending on the potential interference. Further, execution of the program code causes the node to manage sending of control information to the radio device. The control information indicates the start position of the data channel. Further, execution of the program code causes the node to control transmission of data on the data channel based on the start position.

According to a further embodiment of the invention, a computer program or computer program product is provided, e.g., in the form of a non-transitory storage medium, which comprises program code to be executed by at least one processor of a radio device. Execution of the program code causes the radio device to receive control information from a wireless communication network. For a first frequency band, the control information indicates a first start position for transmission of a data channel. For a second frequency band, the control information indicates a second start position for transmission of the data channel. Further, execution of the program code causes the radio device to control receiving of data on the data channel based on the first start position and the second start position.

Details of such embodiments and further embodiments will be apparent from the following detailed description of embodiments.

DETAILED DESCRIPTION OF EMBODIMENTS

Figure 1:
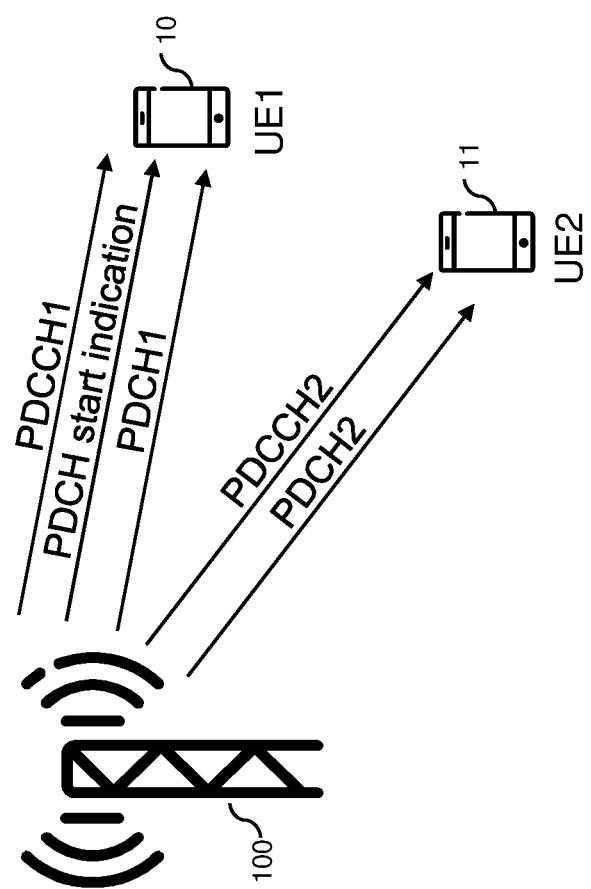
FIG. 1 schematically illustrates a scenario in which radio transmissions are controlled according to an embodiment of the invention.

In the following, concepts in accordance with exemplary embodiments of the invention will be explained in more detail and with reference to the accompanying drawings. The illustrated embodiments relate to control of radio transmissions in a wireless communication network. The wireless communication network may be based on various kinds of radio access technology, e.g., a 4G (4$^{th}$ Generation) radio access technology, such as the LTE technology, or a 5G (5$^{th}$ Generation) radio access technology, such as an evolution of the LTE technology as one pillar and a new radio access technology (sometimes also referred to as "New Radio (NR)" radio access technology) as another pillar. In the illustrated concepts, it is assumed that control of radio transmissions from the network side is accomplished by transmitting DL control information on a DL control channel to a radio device. In the examples as illustrated in the following, this DL control channel will be referred to as PDCCH (Physical DL Control Channel), without loss of generality. Data transmissions are performed on a data channel. In the examples as illustrated in the following, this data channel will be referred to as PDCH (Physical Data Channel), without loss of generality. In the examples as illustrated in the following, the radio device will also be referred to as user equipment (UE), without loss of generality. It is to be understood that such radio device may be any handheld device capable of wireless communication such as a cellular phone, tablet computer, modem, Universal Serial Bus (USB) dongle, laptop, or the like.

The radio transmissions are assumed to be performed on radio resources organized in a time-frequency grid. The time-frequency grid defines resource elements which are each identified by a corresponding time position and frequency position. The frequency positions may correspond to different carrier frequencies arranged according to a predefined frequency raster, and the time positions may correspond to timeslots arranged according to a predefined time raster. The radio transmissions may for example be based on OFDM, the carrier frequencies may correspond to OFDM subcarriers, and the timeslots may correspond to OFDM symbols. However, other kinds of multiplexing schemes could be utilized as well, e.g., FBMC (Filterbank Multicarrier) based schemes or precoded multi-carrier schemes, such as DFTS-OFDM (Discrete Fourier Transform Single Carrier OFDM), SC-FDMA (Single Carrier Frequency Division Multiple Access), or precoded FBMC.

In the terminology as used in the following, it will be assumed that for each UE there is a corresponding PDCCH and a corresponding PDCH, and that the PDCCH is used for controlling data transmissions by the UE on the PDCH, e.g., by sending scheduling information indicating allocation of radio resources of the PDCH. The PDCCH is assumed to be transmitted in the first modulation symbol(s) of a subframe or other kind of time interval defining a time domain granularity of transmitting control information and/or data to the UEs. When utilizing the LTE radio access technology, the PDCH may correspond to the PDSCH or a part thereof (e.g., radio resources of the PDSCH allocated to the given UE). It is noted for the sake of completeness that the PDCCH may also carry control information which is used to schedule transmission of data for the UE in an uplink (UL) direction, i.e., from the UE to the network. Such UL transmission of data may be transmitted via an Physical Uplink Data Channel (PUDCH)

A start position of the PDCH, i.e., a start time position within the subframe or TTI, may be indicated in a flexible manner to the UE. In a given subframe, the PDCH may start immediately after the PDCCH. However, the PDCH may also start earlier, e.g., in the first modulation symbol of the subframe, or later, after a gap with respect to the end of the PDCCH. The start position may be controlled individually for each UE. If the PDCH is transmitted in multiple frequency bands (in the following also referred to as subbands), the start position may also be controlled individually for each frequency band. The start position may be set depending on observed or expected interference of the PDCH with the PDCCH of one or more other UEs.

The start position of the PDCH may be indicated by including corresponding control information into the PDCCH. This control information may for example indicate to the UE if the PDCH of the UE starts at the beginning of the subframe or if it starts after the PDCCH of the UE. The control information may indicate the start position in terms of a bit field or a single bit. For example, such bit or bit field could be explicitly transmitted as data within the PDCCH or otherwise encoded in the PDCCH. In some scenarios, the control information could also be indicated in an implicit manner, e.g., based on a frequency domain position of the PDCCH, or be derived from other control information conveyed by the PDCCH, e.g., from radio resources allocated by scheduling information conveyed on the PDCH. Further, the start position could also be indicated by a bit mask used to scramble the CRC (Cyclic Redundancy Check) of the PDCCH. A single bit of the control information could indicate if the PDCH starts at the beginning of the subframe or after the received PDCCH. For example, a bit value of 0 could indicate that the PDCH starts at subframe beginning, i.e., in the first modulation symbol, and a bit value of 1 could indicate that the PDCH starts after the received PDCCH, which means that there would be no overlap of the PDCH and the and the PDCCH. If the start position is controlled individually for each frequency band, the control information includes a corresponding bit value or any one of the aforementioned indications for each frequency band.

FIG. 1 shows an exemplary scenario in which the concepts as outlined above may be applied. Specifically, FIG. 1 illustrates UEs 10, 11 and an access node 100. The access node 100 may correspond to a base station, such as an eNB ("evolved Node B") of the LTE radio technology or similar radio access point of a 5G radio technology. The UEs 10, 11 are assumed to be located in a coverage region served the access node 100. Such coverage region may also be referred to as a "cell". It is noted that the wireless communication network may actually provide a plurality of access nodes, each serving a corresponding coverage region, and that the UEs 10, 11 or other UEs may move between these different coverage regions and thus connect to the wireless communication network via different access nodes.

For controlling data transmissions from or to the UEs 10, 11 a first PDCCH (PDCCH1) is configured from the access node 100 to the UE 10, and a second PDCCH (PDCCH2) is configured from the access node 100 to the UE 11. Further, a first PDCH (PDCH1) is configured for DL data transmissions from the access node 100 to the UE 10, and a second PDCH (PDCH2) is configured for DL data transmissions from the access node 100 to the UE 11. The PDCCHs are used to convey DL control information from the access node 100 to the respective UE 10, 11. This DL control information may have the purpose of controlling DL data transmissions on the PDCHs. The DL control information may for example include a DL scheduling assignment (DL SA) to the UE 10, 11. The DL scheduling assignment may indicate radio resources of the PDCH which are used for a DL data transmission to the UE 10, 11.

The first PDCCH (PDCCH1) is transmitted on radio resources which are dedicated to the first UE 10, and the second PDCCH (PDCCH2) is transmitted on radio resources which are dedicated to the second UE 11, e.g., on different subcarriers. The first UE 10 will therefore monitor the radio resources of the first PDCCH (PDCCH1), but not of the second PDCCH (PDCCH2), while the second UE will monitor the radio resources of the second PDCCH (PDCCH2), but not of the first PDCCH (PDCCH1). By sending a PDCH start indication to the first UE 10, the access node 100 can flexibly control at which modulation symbol of the subframe the first PDCH (PDCH1) starts. In this way, it can be avoided that radio resources where the first UE 10 expects transmission of the first PDCH (PDCH1) overlap with radio resources where the access node 100 actually transmits the second PDCCH (PDCCH2). On the other hand, it can be allowed that radio resources where the first UE 10 expects transmission of the first PDCH (PDCH1) overlap with radio resources where the access node 100 actually transmits the first PDCCH (PDCCH1), because the first UE 10 is aware of the latter radio resources and those for example may disregard these radio resources when decoding a DL transmission on the first PDCH (PDCH1). Accordingly, even if a DL SA received on the first PDCCH (PDCCH1) indicates radio resources of the first PDCH (PDCH1) which overlap with the radio resources used for transmission of the first PDCCH (PDCCH1), the UE 10 will be able to determine that the radio resources which will be actually used for a radio transmission on the first PDCH (PDCH1) will be the radio resources indicated by the DL SA except for the radio resources configured for transmission of the first PDCCH (PDCCH1). It is noted that while FIG. 1 shows sending of the PDCH start indication only for the first UE 10, a corresponding PDCH start indication could of course also be transmitted to the second UE 11.

Figure 2:
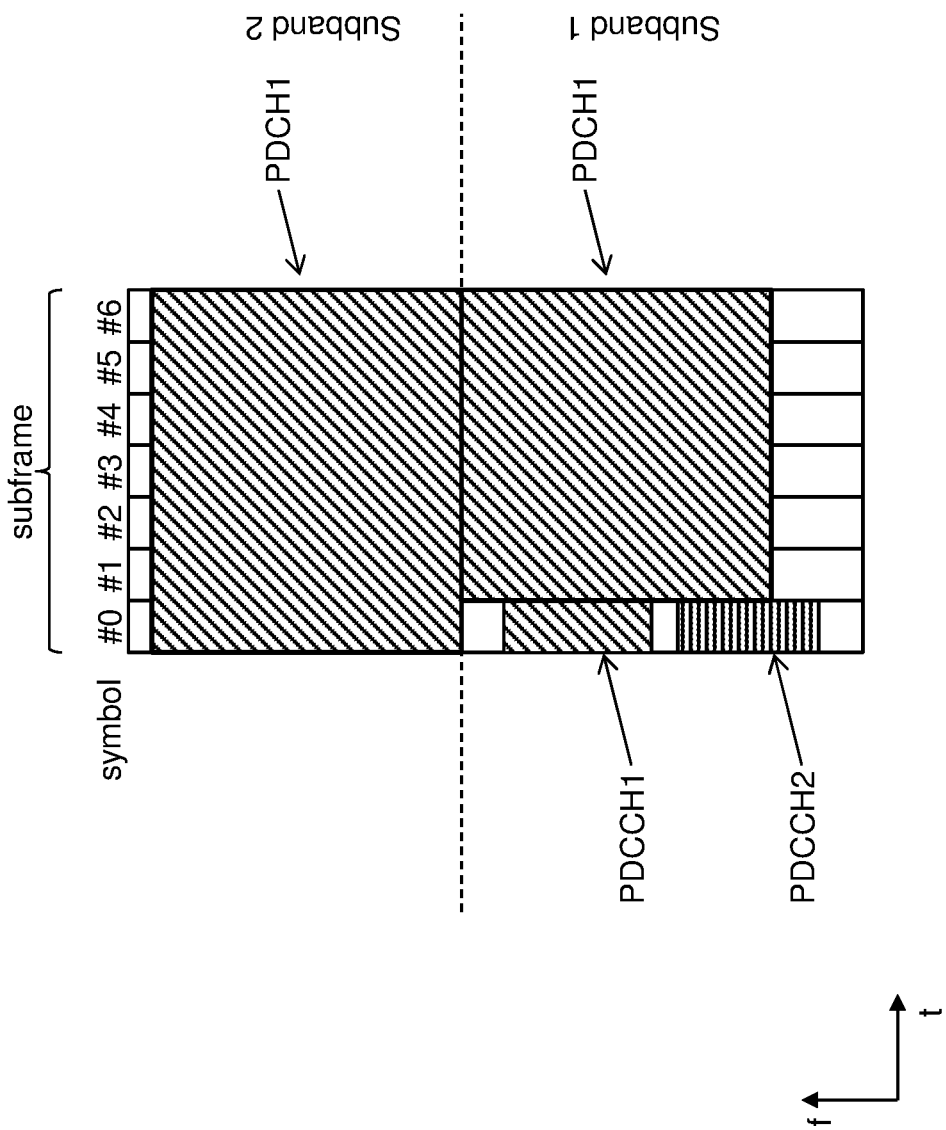
FIG. 2 illustrates an exemplary resource allocation in which DL control channels and a data channel are configured according to an embodiment of the invention.

FIG. 2 illustrates an example of how the first PDCCH (PDCCH1), the second PDCCH (PDCCH2), and the first PDCH (PDCH1) may be mapped to resource elements of the time-frequency grid. In the example of FIG. 2, OFDM modulation using a plurality of subcarriers from a first frequency band (referred to as "Subband 1") and a second frequency band (referred to as "Subband 2") is assumed. The time-frequency grid defines a plurality of resource elements which each correspond to one subcarrier in the frequency (f) domain and a certain OFDM symbol in the time (t) domain. Scheduling and/or other control of transmissions is assumed to be accomplished on a per subframe basis. In the illustrated example, a subframe is formed of seven consecutive OFDM symbols (symbol #0 to symbol #6).

In the example of FIG. 2, the first PDCCH (PDCCH1) and the second PDCCH (PDCCH2) are transmitted in the first OFDM symbol (symbol #0) of the subframe and in the first frequency band (Subband 1). In the first frequency band, the first PDCH (PDCH1) starts after the first PDCCH (PDCCH1) and the second PDCCH (PDCCH2). Accordingly, there is no overlap of radio resources assigned to the first PDCH (PDCH1) with radio resources assigned to the second PDCCH (PDCCH2). In the second frequency band, where neither the first PDCCH (PDCCH1) and the second PDCCH (PDCCH2) is transmitted, the first PDCH (PDCH1) starts already in the first OFDM symbol (symbol #0). Accordingly, in the second frequency band also the first OFDM symbol can be utilized for transmission of the first PDCH (PDCH1).

To obtain the mapping as illustrated in FIG. 2, the access node 100 may send control information to the first UE 10 which includes a first bit value for the first frequency band, which indicates that in the first frequency band the first PDCH (PDCH1) starts after the first PDCCH (PDCCH1) (e.g., the bit value 1 as defined above), and a second bit value for the second frequency band, which indicate that in the second frequency band the first PDCH (PDCH1) starts in the first OFDM symbol of the subframe (e.g., the bit value 0 as defined above). The access node 100 may transmit this control information on the first PDCCH (PDCCH1). For example, a bit field of two bits could be used to indicate the start position of the PDCH individually for the first frequency band and the second frequency band. A bit field "00" could indicate that the PDCH starts at the beginning of the subframe in both frequency bands, a bit field "01" could indicate that in the first frequency band the PDCH starts at the beginning of the subframe and in the second frequency band the PDCH starts after the first OFDM symbol, a bit field "10" could indicate that in the first frequency band the PDCH starts after the first OFDM symbol and in the second frequency band the PDCH starts at the beginning of the subframe after the first OFDM symbol, and a bit field "11" could indicate that the PDCH starts after the first OFDM symbol in both frequency bands. Corresponding rules for interpreting the bit field could be preconfigured in the UE or can be signaled to the UE from the network.

The above-mentioned way of indicating the start position of the PDCH individually for each frequency band may be extended to more than two frequency bands, e.g., by using one bit value per frequency band. To avoid signaling overhead in scenarios with many frequency bands, frequency bands with the same start position (either the frequency bands where the PDCH starts at the beginning of the subframe or the frequency bands where the PDCH starts after the first OFDM symbol) can be restricted to be contiguous. A further reduction of overhead can be achieved by restricting the contiguous allocation of PDCH resources to start either at the first frequency band (e.g., at the lowest available frequency) or end at the last frequency band (e.g., at the highest available frequency). The allocation of contiguous radio resources can be implemented in an efficient manner by indicating a starting resource block and the size of the contiguous resource allocation in terms of a number of resource blocks.

Figure 3:
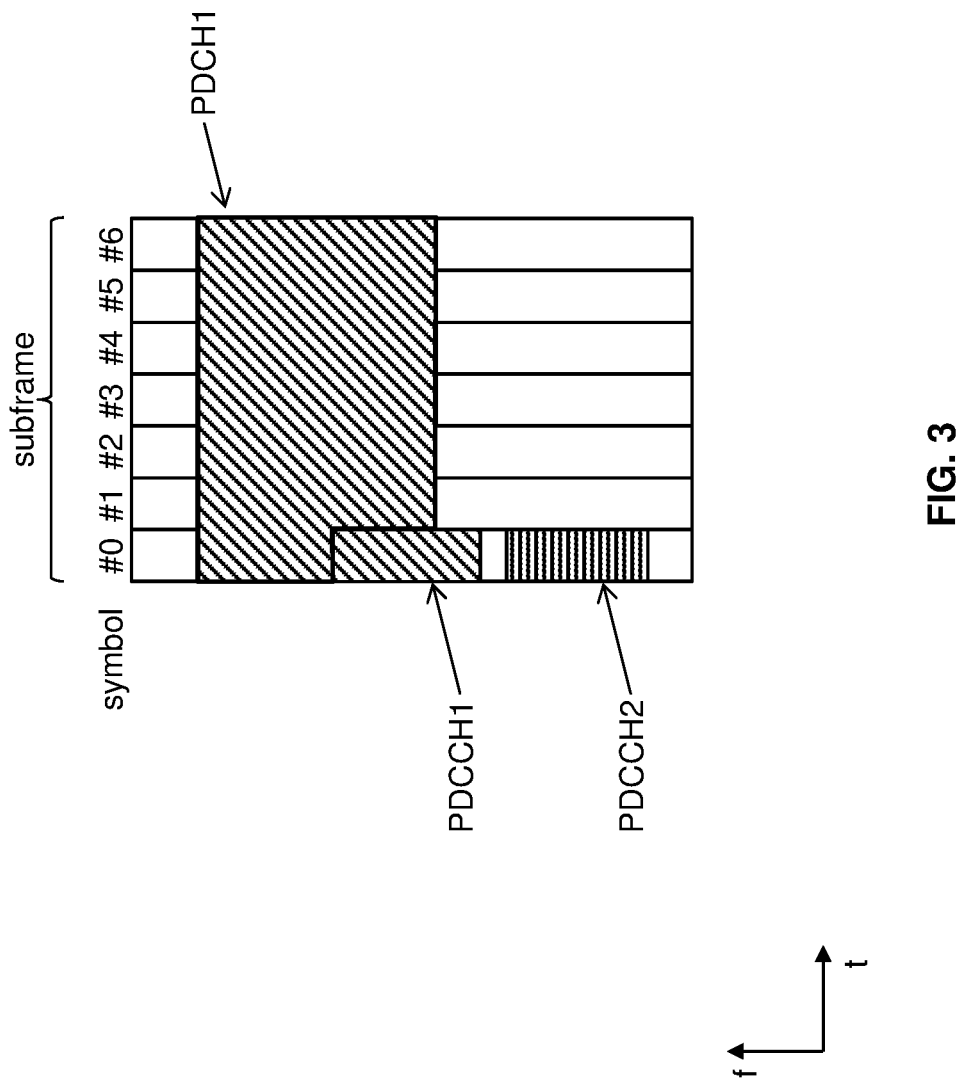
FIG. 3 illustrates a further exemplary resource allocation in which DL control channels and a data channel are configured according to an embodiment of the invention.

FIG. 3 illustrates a further example of how the first PDCCH (PDCCH1), the second PDCCH (PDCCH2), and the first PDCH (PDCH1) may be mapped to resource elements of the time-frequency grid. In the example of FIG. 3, the first PDCCH (PDCCH1) and the second PDCCH (PDCCH2) are transmitted in the first OFDM symbol (symbol #0) of the subframe (in the same frequency band or in different frequency bands). As illustrated, the first PDCH (PDCH1) starts in the first OFDM symbol of the subframe and the radio resources assigned to the first PDCH (PDCH1) overlap with the radio resources used for transmitting the first PDCCH (PDCCH1), but not with the radio resources used for transmitting the second PDCCH (PDCCH2). As mentioned above, this overlap situation can be handled by the first UE 10 because the first UE 10 is aware of the radio resources which are used for transmitting the first PDCCH (PDCCH1) and thus conclude that these radio resources will not be used by the access node 100 for sending a DL data transmission on the first PDCH (PDCH1). Accordingly, an effective resource region of the first PDCH (PDCH1) may have a non-rectangular shape and consist of the radio resources assigned to the first UE 10 by a DL SA transmitted on the first PDCCH (PDCCH1) (which typically may correspond to a rectangular resource region formed of one or more physical resource blocks) except for the overlapping radio resources used for transmission of the first PDCCH (PDCCH1).

To obtain the mapping as illustrated in FIG. 3, the access node 100 may send control information to the first UE 10 which includes a bit value which indicates that the first PDCH (PDCH1) starts in the first OFDM symbol of the subframe (e.g., the bit value 0 as defined above). The access node 100 may transmit this control information on the first PDCCH (PDCCH1). It is noted that in the case of utilizing multiple frequency bands for transmitting the first PDCH (PDCH1), corresponding control information could be transmitted for each of the frequency bands.

Figure 4:
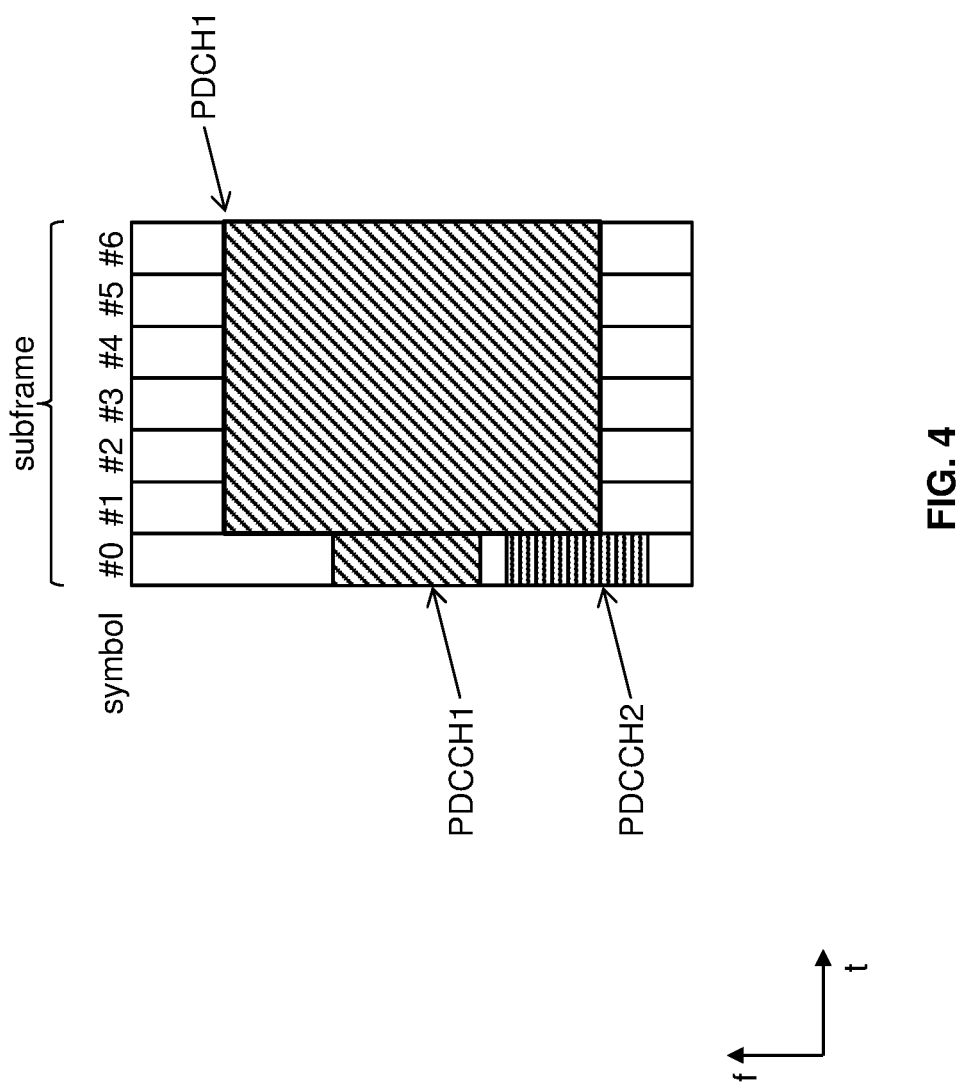
FIG. 4 illustrates a further exemplary resource allocation in which DL control channels and a data channel are configured according to an embodiment of the invention.

FIG. 4 illustrates a further example of how the first PDCCH (PDCCH1), the second PDCCH (PDCCH2), and the first PDCH (PDCH1) may be mapped to resource elements of the time-frequency grid. In the example of FIG. 4, the first PDCCH (PDCCH1) and the second PDCCH (PDCCH2) are transmitted in the first OFDM symbol (symbol #0) of the subframe (in the same frequency band or in different frequency bands). As illustrated, the first PDCH (PDCH1) starts after the first PDCCH (PDCCH1) and the second PDCCH (PDCCH2), to avoid overlap of the radio resources assigned to the first PDCH (PDCH1) with the radio resources used for transmitting the second PDCCH (PDCCH2).

To obtain the mapping as illustrated in FIG. 4, the access node 100 may send control information to the first UE 10 which includes a bit value which indicates the first PDCH (PDCH1) starts after the first PDCCH (PDCCH1) (e.g., the bit value 1 as defined above). The access node 100 may transmit this control information on the first PDCCH (PDCCH1). It is noted that in the case of utilizing multiple frequency bands for transmitting the first PDCH (PDCH1), corresponding control information could be transmitted for each of the frequency bands.

Figure 5:
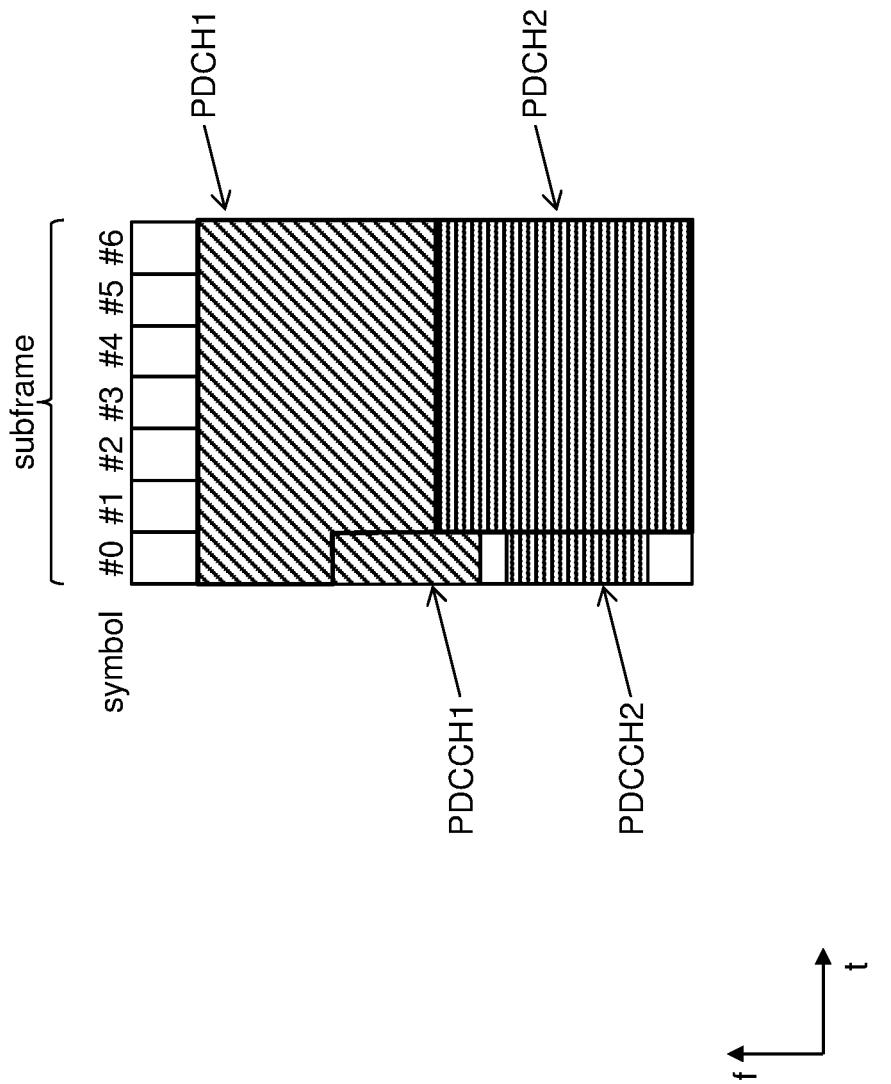
FIG. 5 illustrates a further exemplary resource allocation in which DL control channels and data channels are configured according to an embodiment of the invention.

FIG. 5 illustrates a more complex example which shows how the first PDCCH (PDCCH1), the second PDCCH (PDCCH2), the first PDCH (PDCH1), and the second PDCH (PDCH2) may be mapped to resource elements of the time-frequency grid. In the example of FIG. 5, the first PDCCH (PDCCH1) and the second PDCCH (PDCCH2) are transmitted in the first OFDM symbol (symbol #0) of the subframe (in the same frequency band or in different frequency bands). As illustrated, the first PDCH (PDCH1) starts in the first OFDM symbol of the subframe and the radio resources assigned to the first PDCH (PDCH1) overlap with the radio resources used for transmitting the first PDCCH (PDCCH1), but not with the radio resources used for transmitting the second PDCCH (PDCCH2). As mentioned above, this overlap situation can be handled by the first UE 10 because the first UE 10 is aware of the radio resources which are used for transmitting the first PDCCH (PDCCH1) and thus conclude that these radio resources will not be used by the access node 100 for sending a DL data transmission on the first PDCH (PDCH1). Accordingly, an effective resource region of the first PDCH (PDCH1) may have a non-rectangular shape and consist of the radio resources assigned to the first UE 10 by a DL SA transmitted on the first PDCCH (PDCCH1) (which typically may correspond to a rectangular resource region formed of one or more physical resource blocks) minus the overlapping radio resources used for transmission of the first PDCCH (PDCCH1). The second PDCH starts after the first PDCCH (PDCCH1) and the second PDCCH (PDCCH2), to avoid overlap of the radio resources assigned to the second PDCH (PDCH2) with the radio resources used for transmitting the first PDCCH (PDCCH1).

To obtain the mapping as illustrated in FIG. 5, the access node 100 may send control information to the first UE 10, e.g., on the first PDCCH (PDCCH1), which includes a bit value which indicates that the first PDCH (PDCH1) starts in the first OFDM symbol of the subframe (e.g., the bit value 0 as defined above), and send control information to the second UE 11, e.g., on the second PDCCH (PDCCH2), which indicates that the second PDCH (PDCH2) starts after the second PDCCH (PDCCH2), e.g., the bit value 1 as defined above. It is noted that in the case of utilizing multiple frequency bands for transmitting the first PDCH (PDCH1), corresponding control information could be transmitted for each of the frequency bands.

As can be seen, in the example of FIG. 5 the start position of the PDCH can be defined individually for each of the UEs 10, 11 by sending different configurations information to the UEs.

In the above examples, the PDCCH extends over one OFDM symbol and is transmitted in the first OFDM symbol of the subframe. However, it is noted that the illustrated concepts may be applied in a corresponding manner to situations in which the PDCCH extends over more OFDM symbols (e.g., over two or three OFDM symbols) or is transmitted at a later position within the subframe (e.g., starting at the second or third OFDM symbol of the subframe). In this case, the control information used for indicating the start position of the PDCH of a given UE could for example define whether or not the PDCH starts at a position which avoids overlap with the radio resources of the PDCCH of this UE, e.g., after the PDCCH of this UE. For example, a bit value of 0 could indicate that the PDCH starts at a position which causes the PDCH to overlap with the radio resources of the PDCCH of this UE, e.g., at the same symbol as or even earlier than the PDCCH of the UE, and a bit value of 1 could indicate that the PDCH starts at a position which avoids overlap of the PDCH with the radio resources of the PDCCH of the UE, e.g., after the PDCCH of the UE.

Figure 6:
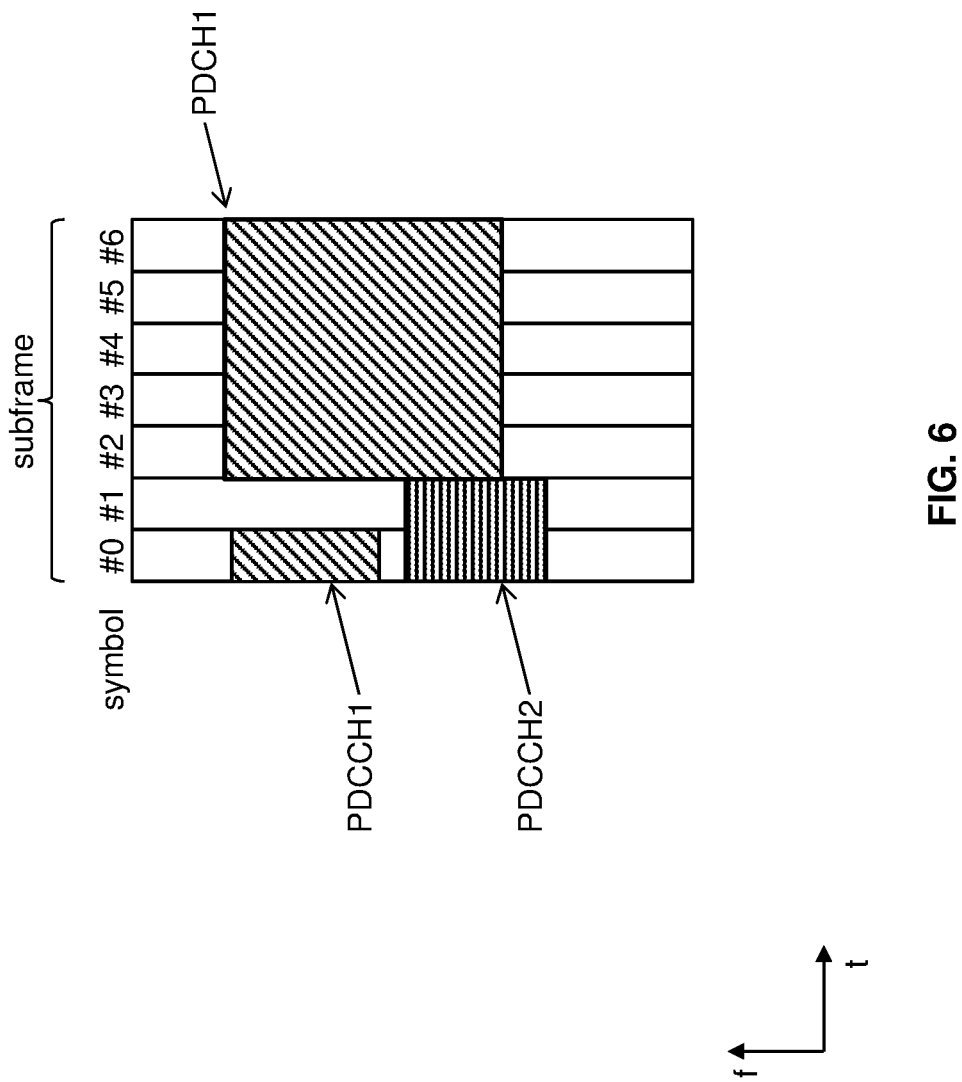
FIG. 6 illustrates a further exemplary resource allocation in which DL control channels and a data channel are configured according to an embodiment of the invention.

In some scenarios, the PDCCHs of different UEs could have different extensions. This may have the effect that the PDCCHs of different UEs end at different positions. A corresponding example is illustrated in FIG. 6, where the first PDCCH (PDCCH1) extends over only the first OFDM symbol of the subframe and the second PDCCH (PDCCH2) extends over the first two OFDM symbols of the subframe. In this case, the control information indicating the start position could indicate whether the PDCH starts at the first OFDM symbol of the subframe are after the longest PDCCH, in the example of FIG. 6 the second PDCCH (PDCCH2). For example, a bit value of 0 could indicate that the PDCH starts at the beginning of the subframe, and a bit value of 1 could indicate that the PDCH starts after the longest possible PDCCH. Information concerning the longest possible extension the longest PDCCH could be pre-configured in the UE or configured in the UE by signaling from the network.

In the example of FIG. 6, the first PDCH (PDCH1) starts after the second PDCCH (PDCCH2), which is assumed to have the longest possible extension. In this way, overlap of the radio resources assigned to the first PDCH (PDCH1) with the radio resources used for transmitting the second PDCCH (PDCCH2) is avoided.

To obtain the mapping as illustrated in FIG. 6, the access node 100 may send control information to the first UE 10 which includes a bit value which indicates that the first PDCH (PDCH1) starts after the longest possible PDCCH (e.g., the bit value 1 as defined above). The access node 100 may transmit this control information on the first PDCCH (PDCCH1). It is noted that in the case of utilizing multiple frequency bands for transmitting the first PDCH (PDCH1), corresponding control information could be transmitted for each of the frequency bands.

Figure 7:
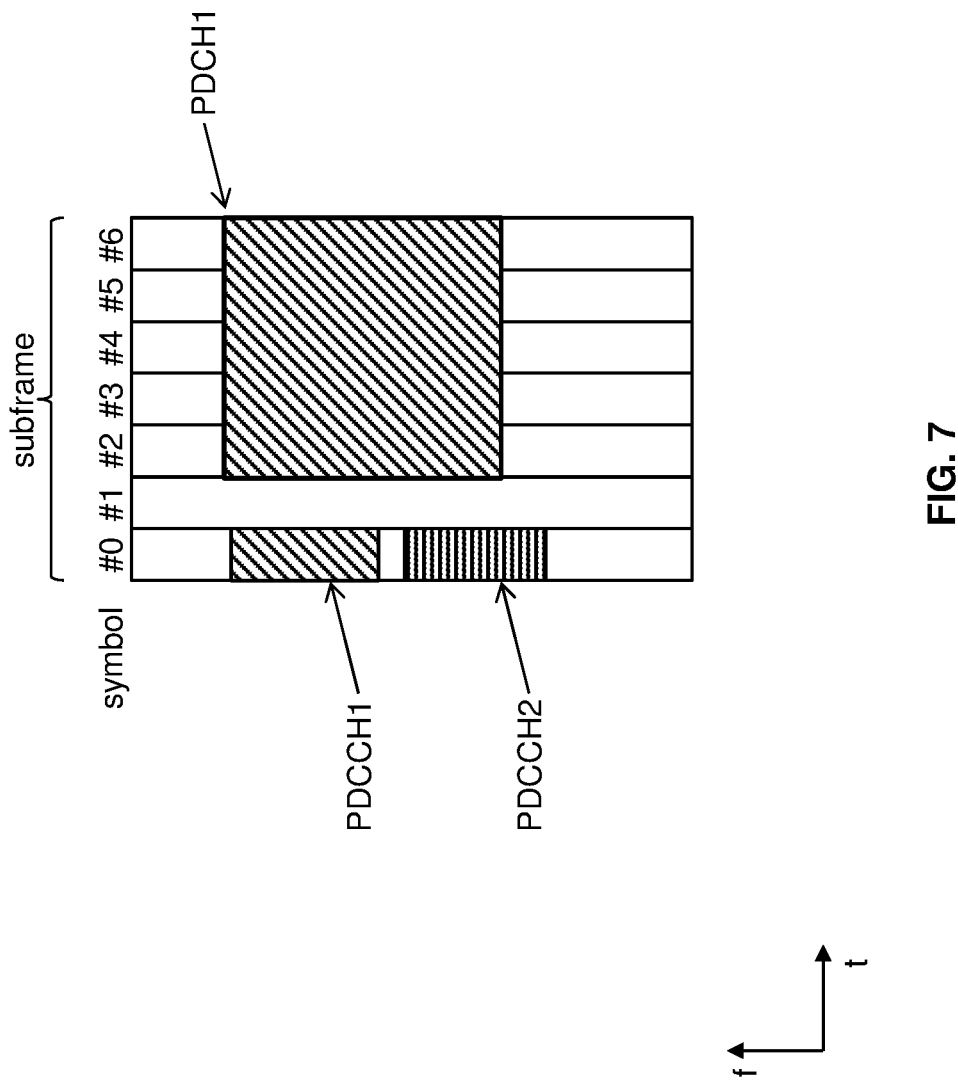
FIG. 7 illustrates a further exemplary resource allocation in which DL control channels and a data channel are configured according to an embodiment of the invention.

FIG. 7 illustrates a further example which is similar to the example of FIG. 6. Also in this example the longest possible extension of the PDCCH is assumed to be two OFDM symbols. However, in this case both the first PDCCH (PDCCH1) and the second PDCCH (PDCCH2) extend over only the first OFDM symbol of the subframe and thus are shorter than the longest possible extension. Nonetheless, the first PDCH (PDCH1) starts after the longest possible extension, in the third OFDM symbol (symbol #2). As can be seen, this resource allocation results in radio resources of the subframe being left unused. To avoid such situations, the start position of the PDCH could be indicated with a finer granularity, e.g., by using a bit field of two or more bits (for each frequency band). When for example assuming a scenario where the longest possible extension of the PDCCH is three OFDM symbols, which means that the extension of the PDCH could be one OFDM symbol, two OFDM symbols, three OFDM symbols, a bit field "00" could indicate that the PDCH starts at the beginning of the subframe, a bit field "01" could indicate that the PDCH starts after the first OFDM symbol, a bit field "10" could indicate that the PDCH starts after the second OFDM symbol, and a bit field "11" could indicate that the PDCH starts after the third OFDM symbol. Corresponding rules for interpreting the bit field could be preconfigured in the UE or can be signaled to the UE from the network.

It is noted that the above-mentioned ways of addressing PDCCH extensions which differ from UE to UE may also be applied to scenarios where different end positions of the PDCCH result from the PDCCH not necessarily starting at the first OFDM symbol of the subframe.

Figure 8:
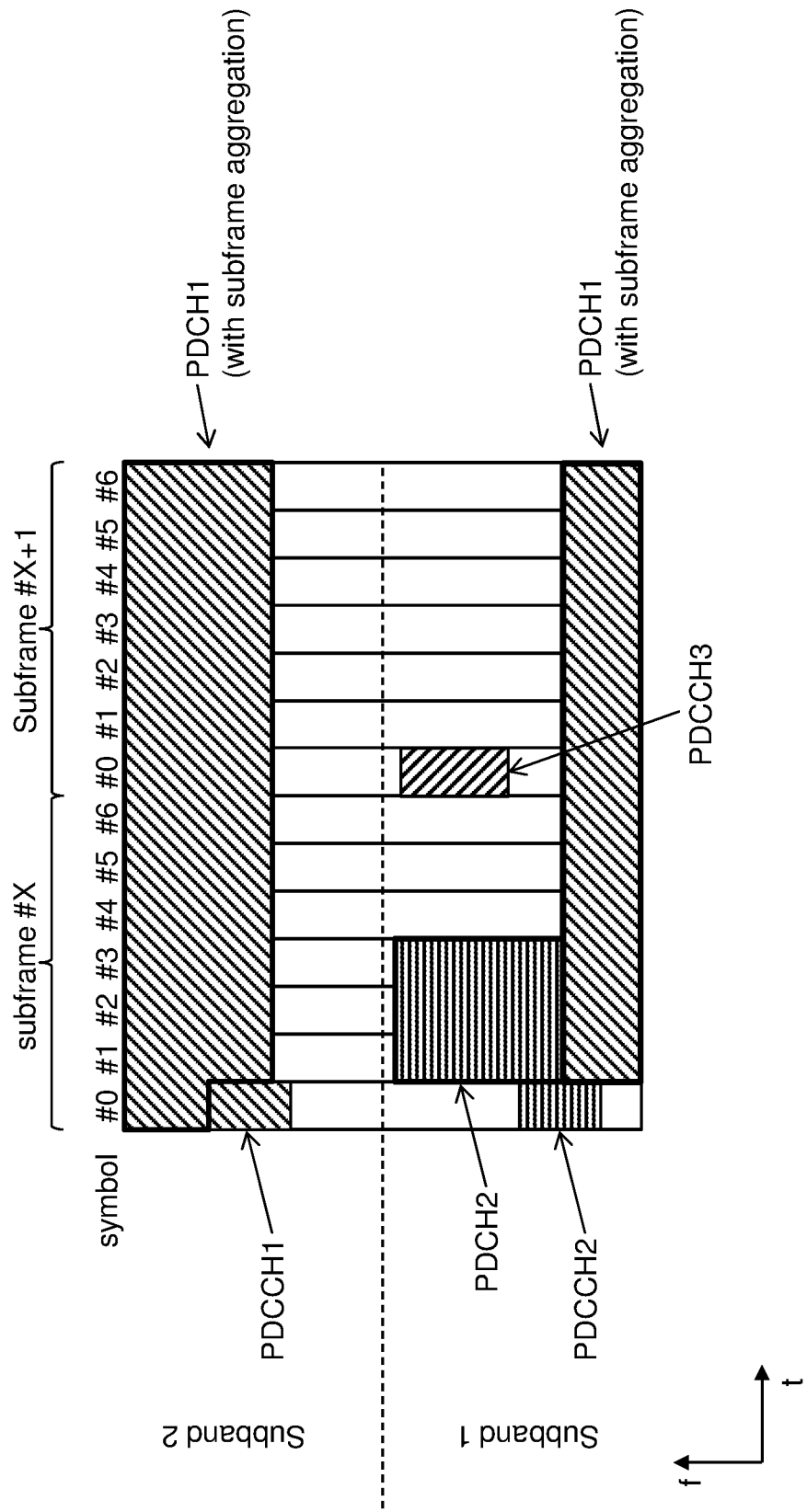
FIG. 8 illustrates a further exemplary resource allocation in which DL control channels and data channels are configured according to an embodiment of the invention.

FIG. 8 illustrates a further example of how the first PDCCH (PDCCH1), the second PDCCH (PDCCH2), a third PDCCH (PDCCH3) of a still further UE, the first PDCH (PDCH1), and the second PDCH (PDCH2) may be mapped to resource elements of the time-frequency grid in a scenario involving subframe aggregation. In the case of subframe aggregation, the PDCCH transmitted in a first subframe is used for controlling radio transmissions on the PDCH not only in this subframe, but also in one or more subsequent subframes. In the example of FIG. 8, the first PDCH (PDCH1) is transmitted in a first subframe (subframe #X) and a subsequent subframe (subframe #X+1) and controlled by the first PDCCH (PDCCH1), which is transmitted only in the first subframe. Similar to the scenario of FIG. 2, the first PDCH (PDCH1) is transmitted in a first frequency band (Subband 1) and a second frequency band (Subband 2). The second PDCCH (PDCCH2) is transmitted in the first subframe and the first frequency band and controls radio transmissions on the second PDCH (PDCH2), which is transmitted only in the first subframe and the first frequency band. The third PDCCH is transmitted in the subsequent subframe and the first frequency band and is illustrated without a corresponding PDCH. For example, the third PDCCH could be used for sending a UL grant.

In the example of FIG. 8, the first PDCCH (PDCCH1) and the second PDCCH (PDCCH2) are transmitted in the first OFDM symbol (symbol #0) of the first subframe. The third PDCCH is transmitted in the first OFDM symbol (symbol #0) of the subsequent subframe. In the first frequency band, the first PDCH (PDCH1) starts after the second PDCCH (PDCCH2). Accordingly, there is no overlap of radio resources assigned to the first PDCH (PDCH1) with radio resources assigned to the second PDCCH (PDCCH2). As further illustrated, in the first frequency band the first PDCH (PDCH1) is scheduled on other frequency resources than the third PDCCH. Accordingly, there is no overlap of radio resources assigned to the first PDCH (PDCH1) with radio resources assigned to the third PDCCH. In the second frequency band, the first PDCH (PDCH1) starts already in the first OFDM symbol (symbol #0) and the radio resources assigned to the first PDCH (PDCH1) overlap with the radio resources used for transmitting the first PDCCH (PDCCH1). This overlap situation can be handled by the first UE 10 because the first UE 10 is aware of the radio resources which are used for transmitting the first PDCCH (PDCCH1) and thus conclude that these radio resources will not be used by the access node 100 for sending a DL data transmission on the first PDCH (PDCH1).

To obtain the mapping as illustrated in FIG. 8, the access node 100 may send control information to the first UE 10 which includes a first bit value for the first frequency band, which indicates that in the first frequency band the first PDCH (PDCH1) starts after the first PDCCH (PDCCH1) (e.g., the bit value 1 as defined above), and a second bit value for the second frequency band, which indicate that in the second frequency band the first PDCH (PDCH1) starts in the first OFDM symbol of the subframe (e.g., the bit value 0 as defined above). The access node 100 may transmit this control information on the first PDCCH (PDCCH1), e.g., using a bit field as explained in connection with FIG. 2.

Figure 9:
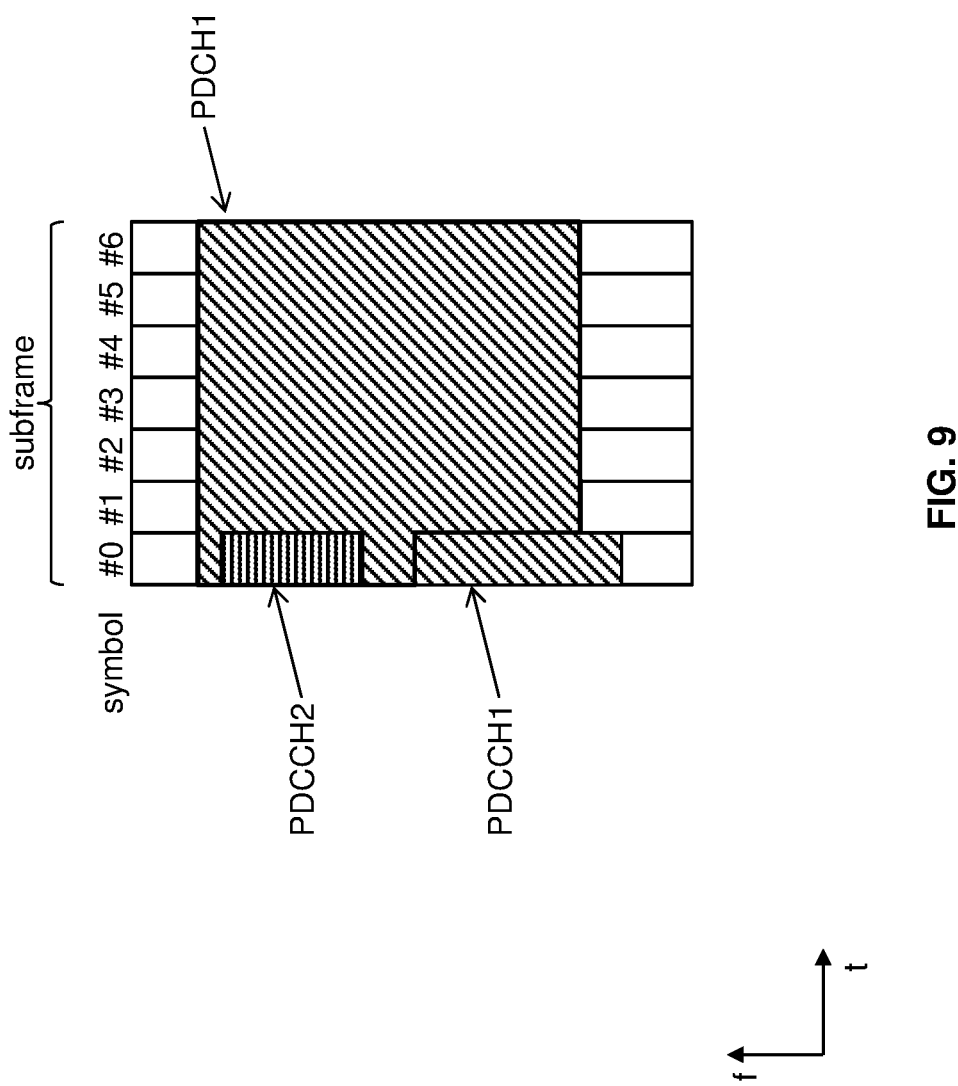
FIG. 9 illustrates a further exemplary resource allocation in which DL control channels and a data channel are configured according to an embodiment of the invention.

The access node 100 may apply various considerations when selecting the start position of the PDCH which is indicated to the UE 10, 11. In this way, configuration of the PDCCHs and scheduling of the PDCHs may be coordinated in an efficient manner. In many scenarios, the access node 100 may aim at avoiding overlap of the radio resources assigned to the PDCH of one UE with the radio resources used for transmission of the PDCCH of another UE. However, in some situations the access node 100 may also select a start position of the PDCH which causes the radio resources assigned to the PDCH of one UE to overlap with the radio resources used for transmission of the PDCCH of another UE. An example of a corresponding mapping of the first PDCCH (PDCCH1), the second PDCCH (PDCCH2), and the first PDCH (PDCH1) is illustrated in FIG. 9. In the example of FIG. 9, the first PDCCH (PDCCH1) and the second PDCCH (PDCCH2) are transmitted in the first OFDM symbol (symbol #0) of the subframe (in the same frequency band or in different frequency bands). As illustrated, the first PDCH (PDCH1) starts in the first OFDM symbol of the subframe and the radio resources assigned to the first PDCH (PDCH1) overlap with the radio resources used for transmitting the first PDCCH (PDCCH1) and also with the radio resources used for transmitting the second PDCCH (PDCCH2). The access node 100 may determine that this overlap situation is acceptable and indicate the start position of the first PDCH (PDCH1) accordingly, e.g., by sending control information to the first UE 10 which includes a bit value which indicates that the first PDCH (PDCH1) starts in the first OFDM symbol of the subframe (e.g., the bit value 0 as defined above). The access node 100 may also control transmission parameters of the first PDCH (PDCH1) and/or of the second PDCCH (PDCCH2) in such a way that the interference is kept below the threshold, e.g., by selection of beamforming configurations, selection of a (robust) modulation and coding scheme, and/or adjustment of transmitter power.

The criteria applied by the access node 100 for assessing whether the overlap of the first PDCH (PDCH1) with the second PDCCH (PDCCH2) is acceptable may for example consider spatial separation of the UEs 10, 11 and/or beamforming configurations applied by the UEs 10, 11. For example, if due to spatial separation and/or beamforming interference of the second PDCCH (PDCCH2) with the first PDCH (PDCH1) is estimated to be below a threshold, so that the UE 10 can decode the first PDCH (PDCH1), the access node 100 may decide that the overlap is acceptable and indicate the start position of the first PDCH (PDCH1) accordingly.

In the above examples, it was assumed that the PDCH is used for DL data transmissions from the access node 100 to the UE 10. However, it is noted that the illustrated concept could be applied in a corresponding manner to scenarios where the PDCH is used for a wireless self-backhaul connection (e.g., from one access node to another access node) or for a device-to-device connection (e.g., from one UE to another UE).

Figure 10:
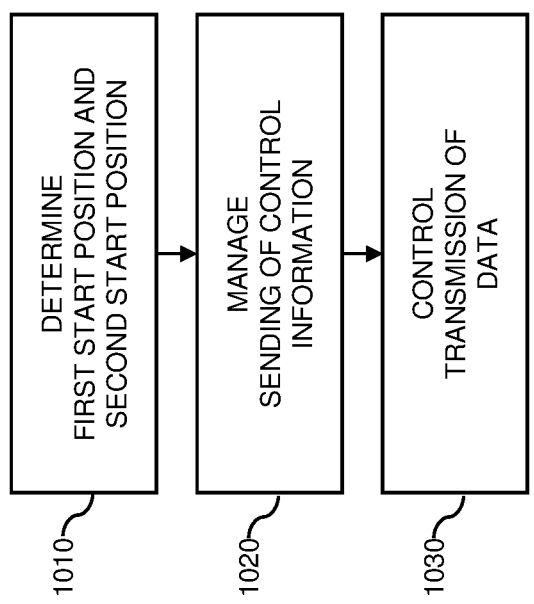
FIG. 10 shows a flowchart for schematically illustrating a method performed by a network node according to an embodiment of the invention.

FIG. 10 shows a flowchart for illustrating a method of controlling radio transmissions in a wireless communication network. The method of FIG. 10 may be utilized for implementing the illustrated concepts in a node of the wireless communication network, e.g., in an access node, such as the above-mentioned access node 100. If a processor-based implementation of the node is used, the steps of the method may be performed by one or more processors of the node. In such a case the node may further comprise a memory in which program code for implementing the below described functionalities is stored.

At optional step 1010, the node may determine a first start position of a data channel of a radio device in a first frequency band and a second start position of the data channel in a second frequency band. The radio device may for example be a UE, such as the UE 10. The data channel may for example be a DL data channel, such as the PDCH in the examples of FIGS. 2 to 9. However, other kinds of data channel could be used as well, e.g., a data channel as a wireless backhaul connection between two access nodes of the wireless communication network or a data channel of a device-to-device connection. At least one of the first start position and the second start position may correspond to a first modulation symbol of a subframe, such as illustrated in the examples of FIGS. 2, 3, 5, 8, and 9.

Determining the first start position and the second start position may involve that the first start position and the second start position are selected depending on a time-frequency position of a DL control channel for transmission of DL control information to at least one further radio device. This selection may be performed by the node. The further radio device may for example be a UE, such as the UE 11. The first start position and the second start position may be selected to avoid overlap of the data channel with the DL control channel, e.g., as shown in the examples of FIGS. 2 to 8. Alternatively, the first start position and the second start position may be selected to allow overlap of the data channel with the DL control channel, e.g., as shown in the example of FIG. 9. The decision whether or not to allow the overlap may be based on potential interference between the data channel and the DL control channel. In some scenarios, the node may also control the transmission of the data on the data channel depending on potential interference between the data channel and the DL control channel. For example, this may involve adjusting transmission parameters, such as beamforming, modulation and coding scheme, or transmit power, in such a way that the potential interference is kept below a threshold and the overlap of the data channel with the DL control channel can be allowed.

At step 1020, the node manages sending of control information to a radio device. The control information indicates the first start position for transmission of the data channel and the second start position for transmission of the data channel. For example, the first start position and the second start position may have been determined by the access node at step 1010. However, the first start position or second start position may also be determined in another way, e.g., indicated by another node of the wireless communication network. The operation of managing sending of the control information may involve actually sending the control information. However, in some cases the operation of managing sending of the control information may also involve deciding not to send the control information. For example, the control information could only be sent if the first start position or the second start position deviates from a default start position.

The control information may indicate the first start position and the second start position in relation to an end of a DL control channel. This may be a DL control channel from the wireless communication network to the radio device. Further, this could be an estimated end position of any other DL control channel, e.g., estimated based on the longest possible extension of a DL control channel and/or latest possible start of a DL control channel. For example, the control information may indicate that the start position is immediately after the end of the DL control channel or a certain number of modulation symbols before or after the end of the DL control channel. Further, the control information may indicate the first start position and the second start position in terms of a selection from a set of multiple start positions. For example, the set of multiple start positions may include two or more predefined start positions which may be identified by a bit value or bit field included in the control information, e.g., as explained in connection with the example of FIG. 7. The predefined start positions can be adjacent, as explained in connection with the example of FIG. 7, but non-adjacent start positions could be utilized as well. In some scenarios, the control information consists of one indicator bit per frequency band. However, the control information could also consist of two or more indicator bits per frequency band. The control information may be transmitted on a DL control channel to the radio device. The control information may be specific to the radio device. Accordingly, the first start position and the second start position may be indicated individually for each radio device.

At step 1030, the node controls transmission of data on the data channel. This action is performed based on the first start position and the second start position. For example, this may involve that in the first frequency band the node starts mapping data to the data channel from the first start position, while in the second frequency band the node starts mapping data to the data channel from the second start position.

Figure 11:
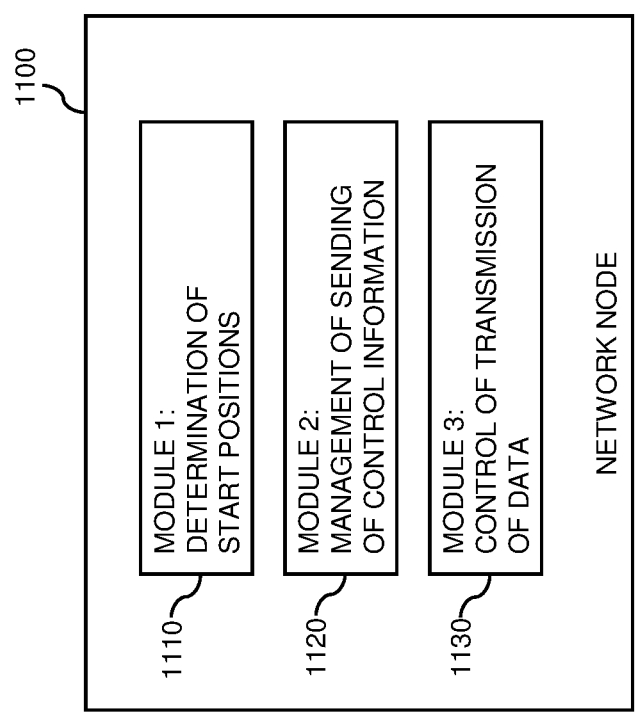
FIG. 11 shows a block diagram for illustrating functionalities of a network node according to an embodiment of the invention.

FIG. 11 shows a block diagram for illustrating functionalities of a node 1100 for a wireless communication network. The node 1100 is assumed to operate according to the method of FIG. 10. As illustrated, the node 1100 may optionally be provided with a module 1110 configured to determine a first start position and a second start position, such as explained in connection with step 1010. Further, the node 1100 may be provided with a module 1120 configured to manage sending of control information, such as explained in connection with step 1020. Further, the node 1100 may be provided with a module 1130 configured to control transmission of data, such as explained in connection with step 1030.

It is noted that the node 1100 may include further modules for implementing other functionalities, such as known functionalities of an access node, such as an eNB of LTE technology. Further, it is noted that the modules of the node 1100 do not necessarily represent a hardware structure of the node 1100, but may also correspond to functional elements, e.g., implemented by hardware, software, or a combination thereof.

Figure 12:
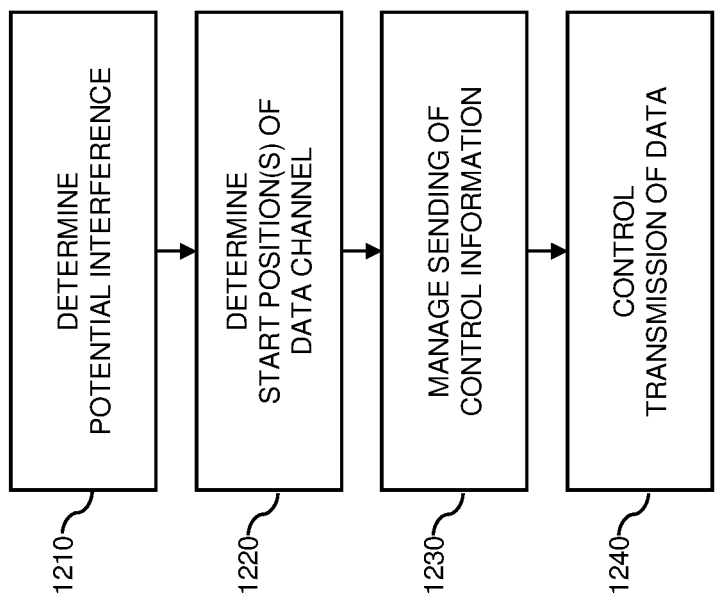
FIG. 12 shows a flowchart for schematically illustrating a further method performed by a network node according to an embodiment of the invention.

FIG. 12 shows a flowchart for illustrating a further method of controlling radio transmissions in a wireless communication network. The method of FIG. 12 may be utilized for implementing the illustrated concepts in a node of the wireless communication network, e.g., in an access node, such as the above-mentioned access node 100. If a processor-based implementation of the node is used, the steps of the method may be performed by one or more processors of the node. In such a case the node may further comprise a memory in which program code for implementing the below described functionalities is stored.

At step 1210, the node determines potential interference of a data channel for a radio device and a DL control channel for a further radio device. The radio devices may for example be UEs, such as the UE 10 and the UE 11. The radio device may for example be a UE, such as the UE 10. The data channel may for example be a DL data channel, such as the PDCH in the examples of FIGS. 2 to 9. However, other kinds of data channel could be used as well, e.g., a data channel as a wireless backhaul connection between two access nodes of the wireless communication network or a data channel of a device-to-device connection.

At step 1220, the node determines a start position of the data channel. This action is performed depending on the potential interference determined at step 1210. In some scenarios, the node may also determine multiple positions of the data channel, e.g., one start position frequency band.

The start position may correspond to a first modulation symbol of a subframe, such as illustrated in the examples of FIGS. 2, 3, 5, 8, and 9. The start position may be selected depending on a time-frequency position of a DL control channel for transmission of DL control information to at least one further radio device. The further radio device may for example be a UE, such as the UE 11. The start position may be selected to avoid overlap of the data channel with the DL control channel, e.g., as shown in the examples of FIGS. 2 to 8. Alternatively, the start position may be selected to allow overlap of the data channel with the DL control channel, e.g., as shown in the example of FIG. 9. The decision whether or not to allow the overlap may be based on potential interference between the data channel and the DL control channel. In some scenarios, the node may also control the transmission of the data on the data channel depending on potential interference between the data channel and the DL control channel. For example, this may involve adjusting transmission parameters, such as beamforming, modulation and coding scheme, or transmit power, in such a way that the potential interference is kept below a threshold and the overlap of the data channel with the DL control channel can be allowed.

At step 1230, the node manages sending of control information to the radio device. The control information indicates the start position of the data channel. The operation of managing sending of the control information may involve actually sending the control information. However, in some cases the operation of managing sending of the control information may also involve deciding not to send the control information. For example, the control information could only be sent if the start position deviates from a default start position.

The control information may indicate the start position in relation to an end of a DL control channel. This may be a DL control channel from the wireless communication network to the radio device. Further, this could be an estimated end position of any other DL control channel, e.g., estimated based on the longest possible extension of a DL control channel and/or latest possible start of a DL control channel. For example, the control information may indicate that the start position is immediately after the end of the DL control channel or a certain number of modulation symbols before or after the end of the DL control channel. Further, the control information may indicate the start position in terms of a selection from a set of multiple start positions. For example, the set of multiple start positions may include two or more predefined start positions which may be identified by a bit value or bit field included in the control information, e.g., as explained in connection with the example of FIG. 7. The predefined start positions can be adjacent, as explained in connection with the example of FIG. 7, but non-adjacent start positions could be utilized as well. In some scenarios, the control information consists of one indicator bit per frequency band. However, the control information could also consist of two or more indicator bits per frequency band. The control information may be transmitted on a DL control channel to the radio device.

The control information may be specific to the radio device. Accordingly, the start position may be indicated individually for each radio device. Further, the indicated start position may be specific to one of multiple frequency bands utilized by the radio device. Accordingly, an individual start position may be indicated for each frequency band used for transmission of the data channel.

At step 1240, the node controls transmission of data on the data channel. This is accomplished based on the start position determined at step 1220. For example, this may involve that the node starts mapping data to the data channel from the start position.

Figure 13:
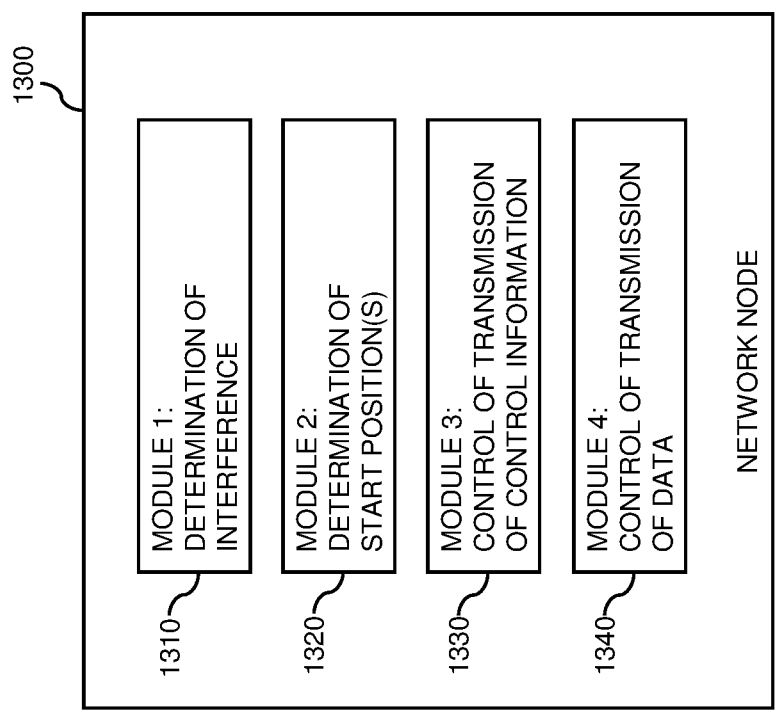
FIG. 13 shows a block diagram for illustrating functionalities of a network node according to an embodiment of the invention.

FIG. 13 shows a block diagram for illustrating functionalities of a node 1300 for a wireless communication network. The node 1100 is assumed to operate according to the method of FIG. 12. As illustrated, the node 1300 may be provided with a module 1310 configured determine interference, such as explained in connection with step 1210. Further, the node 1300 may be provided with a module 1320 configured to determine one or more start positions, such as explained in connection with step 1220. Further, the node 1300 may be provided with a module 1330 configured to manage sending of control information, such as explained in connection with step 1230. Further, the node 1300 may be provided with a module 1340 configured to control transmission of data, such as explained in connection with step 1240.

It is noted that the node 1300 may include further modules for implementing other functionalities, such as known functionalities of an access node, such as an eNB of LTE technology. Further, it is noted that the modules of the node 1300 do not necessarily represent a hardware structure of the node 1300, but may also correspond to functional elements, e.g., implemented by hardware, software, or a combination thereof.

Figure 14:
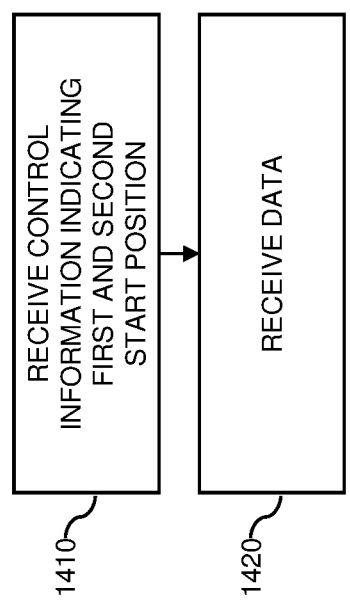
FIG. 14 shows a flowchart for schematically illustrating a method performed by a radio device according to an embodiment of the invention.

FIG. 14 shows a flowchart for illustrating a further method of controlling radio transmissions in a wireless communication network. The method of FIG. 14 may be utilized for implementing the illustrated concepts in radio device, e.g., in a UE, such as the UE 10. If a processor-based implementation of the radio device is used, the steps of the method may be performed by one or more processors of the radio device. In such a case the radio device may further comprise a memory in which program code for implementing the below described functionalities is stored.

At optional step 1410, the radio device receives control information. The control information may be received from a node of the wireless communication network, e.g., from an access node, such as the access node 100. The control information indicates a first start position of a data channel of the radio device in a first frequency band and a second start position of the data channel in a second frequency band. The data channel may for example be a DL data channel, such as the PDCH in the examples of FIGS. 2 to 9. However, other kinds of data channel could be used as well, e.g., a data channel as a wireless backhaul connection between two access nodes of the wireless communication network or a data channel of a device-to-device connection. At least one of the first start position and the second start position may correspond to a first modulation symbol of a subframe, such as illustrated in the examples of FIGS. 2, 3, 5, 8, and 9.

The first start position and the second start position may be selected depending on a time-frequency position of a DL control channel for transmission of DL control information to at least one further radio device. The further radio device may for example be a UE, such as the UE 11. The first start position and the second start position may be selected to avoid overlap of the data channel with the DL control channel, e.g., as shown in the examples of FIGS. 2 to 8. Alternatively, the first start position and the second start position may be selected to allow overlap of the data channel with the DL control channel, e.g., as shown in the example of FIG. 9.

The control information may indicate the first start position and the second start position in relation to an end of a DL control channel. This may be a DL control channel from the wireless communication network to the radio device. Further, this could be an estimated end position of any other DL control channel, e.g., estimated based on the longest possible extension of a DL control channel and/or latest possible start of a DL control channel. For example, the control information may indicate that the start position is immediately after the end of the DL control channel or a certain number of modulation symbols before or after the end of the DL control channel. Further, the control information may indicate the first start position and the second start position in terms of a selection from a set of multiple start positions. For example, the set of multiple start positions may include two or more predefined start positions which may be identified by a bit value or bit field included in the control information, e.g., as explained in connection with the example of FIG. 7. The predefined start positions can be adjacent, as explained in connection with the example of FIG. 7, but non-adjacent start positions could be utilized as well. In some scenarios, the control information consists of one indicator bit per frequency band. However, the control information could also consist of two or more indicator bits per frequency band. The control information may be transmitted on a DL control channel to the radio device. The control information may be specific to the radio device. Accordingly, the first start position and the second start position may be indicated individually for each radio device.

At step 1430, the radio device controls receiving of data on the data channel. This action is performed based on the first start position and the second start position indicated by the control information. For example, this may involve that in the first frequency band the radio device starts monitoring of radio resources of a TTI and/or decoding of signals received on radio resources of the TTI from the first start position, while in the second frequency band the radio device starts monitoring of radio resources of a TTI and/or decoding of signals received on radio resources of the TTI from the second start position.

Figure 15:
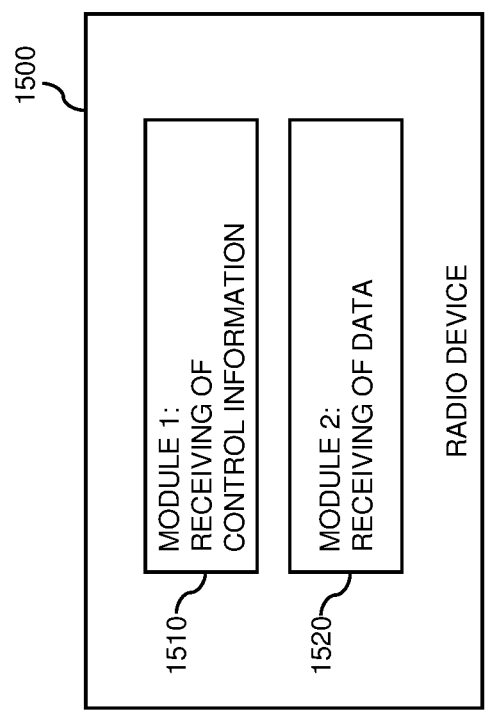
FIG. 15 shows a block diagram for illustrating functionalities of a radio device according to an embodiment of the invention.

FIG. 15 shows a block diagram for illustrating functionalities of a radio device 1500 which operates according to the method of FIG. 14. As illustrated, the radio device 1500 may be provided with a module 1510 configured to receive control information, such as explained in connection with step 1410. Further, the radio device 1500 may be provided with a module 1520 configured to control receiving of data, such as explained in connection with step 1420.

It is noted that the radio device 1500 may include further modules for implementing other functionalities, such as known functionalities of a UE supporting the LTE technology. Further, it is noted that the modules of the radio device 1500 do not necessarily represent a hardware structure of the radio device 1500, but may also correspond to functional elements, e.g., implemented by hardware, software, or a combination thereof.

Further, it is to be understood that the methods of FIGS. 10, 12, and 14 may be combined with each other. For example, the same node of the wireless communication network could operate according to the methods of both FIG. 10 and FIG. 12. Further, methods could be combined in a system including a node operating according to the method of FIG. 10 and/or FIG. 12 and one or more radio devices operating according to the method of FIG. 14.

Figure 16:
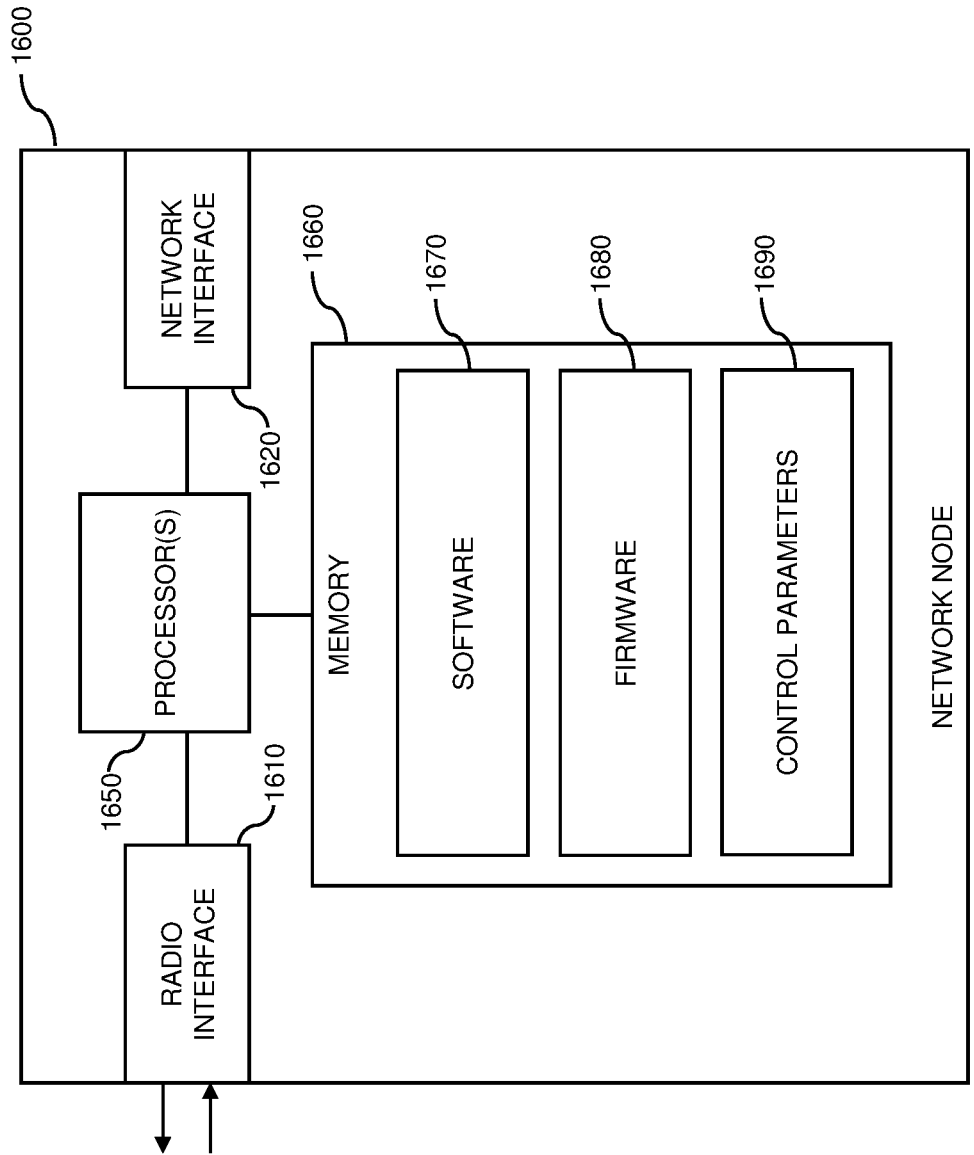
FIG. 16 schematically illustrates structures of a network node according to an embodiment of the invention.

FIG. 16 illustrates a processor-based implementation of node 1600 for a wireless communication network. The node 1600 may be used for implementing the above described concepts. The node 1600 may correspond to the node operating according to the method of FIG. 10 or 12, such as the above-mentioned access node 100.

As illustrated, the node 1600 may include a radio interface 1610 for connecting to one or more radio device, such as the above-mentioned UEs 10, 11 or the radio device in the method of FIG. 14. The radio interface may for example be used for sending the above-mentioned DL control channel or data channel. Further, the node 1600 may include a network interface 1620 for connecting to one or more other nodes of the wireless communication network. The network interface 1620 may for example be used for establishing a backhaul connection of the node.

Further, the node 1600 may include one or more processors 1650 coupled to the interfaces 1610, 1620 and a memory 1660 coupled to the processor(s) 1650. By way of example, the interfaces 1610, 1620 the processor(s) 1650, and the memory 1660 could be coupled by one or more internal bus systems of the node 1600. The memory 1660 may include a Read Only Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 1660 may include software 1670, firmware 1680, and/or control parameters 1690. The memory 1660 may include suitably configured program code to be executed by the processor(s) 1650 so as to implement the above-described functionalities of a wireless communication network node, such as explained in connection with FIG. 10 or 12. This program code may be stored as part of the software 1670 and/or as part of the firmware 1680. Further, this program code may operate using one or more of the control parameters 1690.

It is to be understood that the structures as illustrated in FIG. 16 are merely schematic and that the node 1600 may actually include further components which, for the sake of clarity, have not been illustrated, e.g., further interfaces or processors. Also, it is to be understood that the memory 1660 may include further program code for implementing known functionalities of a wireless communication network node, e.g., known functionalities of an eNB of the LTE technology or of a 5G access node. According to some embodiments, also a computer program may be provided for implementing functionalities of the node 1600, e.g., in the form of a physical medium storing the program code and/or other data to be stored in the memory 1660 or by making the program code available for download or by streaming.

Figure 17:
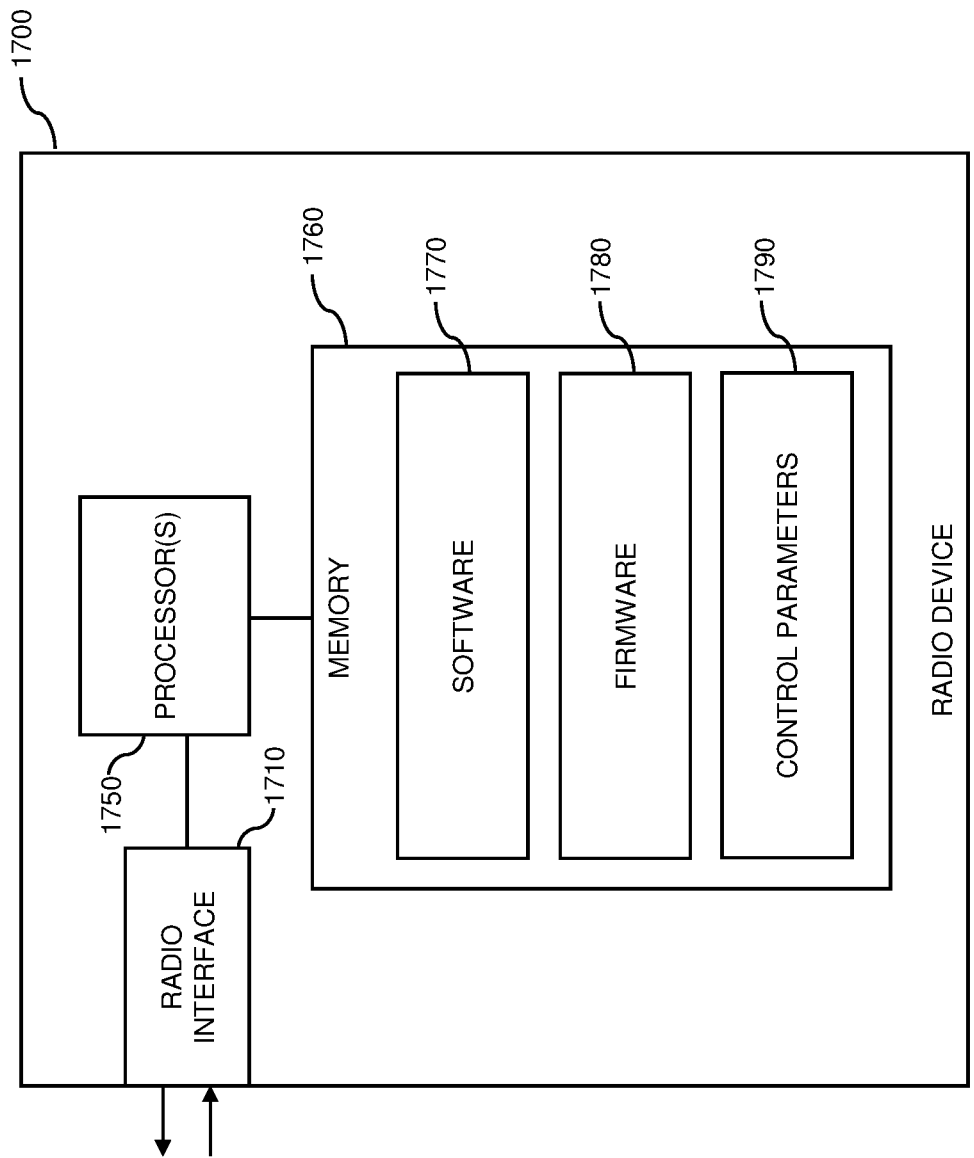
FIG. 17 schematically illustrates structures of a radio device according to an embodiment of the invention.

FIG. 17 illustrates a processor-based implementation of a radio device 1700 which may be used for implementing the above described concepts. The radio device 1700 may correspond to the radio device operating according to the method of FIG. 14, such as the above-mentioned UE 10.

As illustrated, the radio device 1700 may include a radio interface 1710 for connecting to a wireless communication network, e.g., via an access node of the wireless communication network, such as the above-mentioned access node 100 or the access node in the method of FIG. 10 or 12. The radio interface may for example be used for receiving the above-mentioned DL control channel or data channel.

Further, the radio device 1700 may include one or more processors 1750 coupled to the radio interface 1710 and a memory 1760 coupled to the processor(s) 1750. By way of example, the radio interface 1710, the processor(s) 1750, and the memory 1760 could be coupled by one or more internal bus systems of the radio device 1700. The memory 1760 may include a ROM, e.g., a flash ROM, a RAM, e.g., a DRAM or SRAM, a mass storage, e.g., a hard disk or solid state disk, or the like. As illustrated, the memory 1760 may include software 1770, firmware 1780, and/or control parameters 1790. The memory 1760 may include suitably configured program code to be executed by the processor(s) 1750 so as to implement the above-described functionalities of a radio device, such as explained in connection with FIG. 14. This program code may be stored as part of the software 1770 and/or as part of the firmware 1780. Further, this program code may operate using one or more of the control parameters 1790.

It is to be understood that the structures as illustrated in FIG. 17 are merely schematic and that the radio device 1700 may actually include further components which, for the sake of clarity, have not been illustrated, e.g., further interfaces or processors. Also, it is to be understood that the memory 1760 may include further program code for implementing known functionalities of a radio device, e.g., known functionalities of a UE supporting the LTE radio technology or a 5G radio technology. According to some embodiments, also a computer program may be provided for implementing functionalities of the radio device 1700, e.g., in the form of a physical medium storing the program code and/or other data to be stored in the memory 1760 or by making the program code available for download or by streaming.

As can be seen, the concepts as described above may be used for efficiently controlling radio transmissions in a wireless communication network. In particular, the radio resources assigned for transmission of a data channel of one radio device may be efficiently coordinated with the radio resources used for transmission of DL control channels to other radio devices. In this way, conflicting assignments or allocations of radio resources may be avoided. In some situations, an overlapping assignment may be tolerated based on assessing potential interference.

It is to be understood that the examples and embodiments as explained above are merely illustrative and susceptible to various modifications. For example, the illustrated concepts may be applied in connection with various kinds of radio technologies, without limitation to the above-mentioned examples of the LTE radio technology or a 5G radio technology. Further, the illustrated concepts may be applied in connection with various kinds of data channels, including DL data channels, device-to-device data channels, or wireless backhaul data channels. Moreover, it is to be understood that the above concepts may be implemented by using correspondingly designed software to be executed by one or more processors of an existing device, or by using dedicated device hardware. Further, it should be noted that the illustrated nodes may each be implemented as a single device or as a system of multiple interacting devices.

The invention claimed is:

1. A method in a node of a wireless communication network of controlling radio transmission in a wireless communication network, the method comprising:

managing sending of downlink control information to a user equipment, the downlink control information controlling reception by the user equipment of a data channel which is based on modulation using subcarriers from a first frequency subband and a second frequency subband, and the downlink control information indicating, for the first frequency subband, a first start position for transmission of the data channel, and, for a second frequency subband, a second start position for transmission of the same data channel, wherein the downlink control information indicates the first start position and the second start position in terms of a selection from a set of multiple start positions, with the selection made to avoid overlap of the data channel with a Physical Downlink Control Channel on which the downlink control information is sent, and based on the first start position and the second start position, controlling transmission of data on the data channel.

2. The method according to claim 1, wherein at least one of the first start position and the second start position corresponds to a first modulation symbol of a transmission time interval.

3. The method according to claim 1, wherein the downlink control information indicates the first start position and the second start position in relation to an end of the Physical Downlink Control Channel.

4. The method according to claim 1, wherein the first and second start positions are respective positions in time within the same transmission time interval, and wherein the first and second frequency subbands span different respective sets of subcarriers of the same carrier.

5. A method in a user equipment of controlling radio transmission in a wireless communication network, the method comprising:

receiving downlink control information from the wireless communication network, the downlink control information controlling reception by the user equipment of a data channel which is based on modulation using subcarriers from a first frequency subband and a second frequency subband, and the downlink control information indicating, for the first frequency subband, a first start position for transmission of the data channel and, for the second frequency subband, a second start position for transmission of the same data channel, wherein the downlink control information indicates the first start position and the second start position in terms of a selection from a set of multiple start positions, with the selection made to avoid overlap of the data channel with a Physical Downlink Control Channel on which the downlink control information is received, and based on the first start position and the second start position, controlling receiving of data on the data channel.

6. The method according to claim 5, wherein at least one of the first start position and the second start position corresponds to a first modulation symbol of a transmission time interval.

7. The method according to claim 5, wherein the downlink control information indicates the first start position and the second start position in relation to an end of the Physical Downlink Control Channel.

8. The method according to claim 5, wherein the first and second start positions are respective positions in time within the same transmission time interval, and wherein the first and second frequency subbands span different respective sets of subcarriers of the same carrier.

9. A node for a wireless communication network, the node comprising:

one or more processors and a memory, the memory including program code executable by the one or more processors whereby the node is configured to:

manage sending of downlink control information to a user equipment, the downlink control information controlling reception by the user equipment of a data channel based on modulation using subcarriers from a first frequency subband and a second frequency subband, and the downlink control information indicating, for the first frequency subband, a first start position for transmission of the data channel and, for the second frequency subband, a second start position for transmission of the same data channel, wherein the downlink control information indicates the first start position and the second start position in terms of a selection from a set of multiple start positions, with the selection made to avoid overlap of the data channel with a Physical Downlink Control Channel on which the downlink control information is sent; and based on the first start position and the second start position, control transmission of data on the data channel.

10. The node according to claim 9, wherein the node is configured to select the first start position and the second start position depending on a time-frequency position of the Physical Downlink Control Channel.

11. The node according to claim 9, wherein at least one of the first start position and the second start position corresponds to a first modulation symbol of a transmission time interval.

12. The node according to claim 9, wherein the downlink control information indicates the first start position and the second start position in relation to an end of the Physical Downlink Control Channel.

13. The node according to claim 9, wherein the first and second start positions are respective positions in time within the same transmission time interval, and wherein the first and second frequency subbands span different respective sets of subcarriers of the same carrier.

14. A user equipment comprising:

one or more processors and a memory, the memory including program code executable by the one or more processors whereby the user equipment is configured to:

receive downlink control information from a wireless communication network, the control information controlling reception by the user equipment of a data channel which is based on modulation using subcarriers from a first frequency subband and a second frequency subband, and the downlink control information indicating, for the first frequency subband, a first start position for transmission of a data channel and, for the second frequency subband, a second start position for transmission of the same data channel, wherein the downlink control information indicates the first start position and the second start position in terms of a selection from a set of multiple start positions, with the selection made to avoid overlap of the data channel with a Physical Downlink Control Channel, and based on the first start position and the second start position, control receiving of data on the data channel.

15. The user equipment according to claim 14, wherein at least one of the first start position and the second start position corresponds to a first modulation symbol of a transmission time interval.

16. The user equipment according to claim 14, wherein the downlink control information indicates the first start position and the second start position in relation to an end of the Physical Downlink Control Channel.

17. The user equipment according to claim 14, wherein the first and second start positions are respective positions in time within the same transmission time interval, and wherein the first and second frequency subbands span different respective sets of subcarriers of the same carrier.

* * * * *

UNITED STATES PATENT AND TRADEMARK OFFICE
CERTIFICATE OF CORRECTION

| | | |
|---|---|---|
| PATENT NO. | : 11,997,044 B2 | Page 1 of 1 |
| APPLICATION NO. | : 18/143488 | |
| DATED | : May 28, 2024 | |
| INVENTOR(S) | : Baldemair et al. | |

It is certified that error appears in the above-identified patent and that said Letters Patent is hereby corrected as shown below:

In the Specification

In Column 1, Line 7, delete "2021," and insert -- 2021, now issued as U.S. Pat. No. 11,683,143, --, therefor.

In Column 1, Line 62, delete "time-frequency-grid" and insert -- time-frequency grid --, therefor.

In Column 5, Lines 53-54, delete "DFTS-OFDM (Discrete Fourier Transform Single Carrier OFDM)," and insert -- DFT-S-OFDM (Discrete Fourier Transform-Spread-OFDM), --, therefor.

In Column 6, Line 6, delete "(PUDCH)" and insert -- (PUDCH). --, therefor.

In Column 6, Line 43, delete "and the and the" and insert -- and the --, therefor.

In Column 10, Line 57, delete "are after" and insert -- after --, therefor.

In Column 10, Line 63, delete "extension" and insert -- extension of --, therefor.

In Column 16, Line 54, delete "configured" and insert -- configured to --, therefor.

Signed and Sealed this
Eighteenth Day of February, 2025

Coke Morgan Stewart
*Acting Director of the United States Patent and Trademark Office*